US012118604B2

(12) United States Patent
Krishnamoorthy et al.

(10) Patent No.: US 12,118,604 B2
(45) Date of Patent: Oct. 15, 2024

(54) SLOT SELECTION FOR PICKUP SCHEDULING AND ORDER FULFILLMENT

(71) Applicant: Cognetry Labs Inc., Hillsboro, OR (US)

(72) Inventors: Balasubramanian Krishnamoorthy, Portland, OR (US); Muthukumar Udaiyanathan, Hillsboro, OR (US); Sandeep Sivanpillai Nair, Thiruvananthapuram (IN)

(73) Assignee: Cognetry Labs Inc., Hillsboro, OR (US)

(*) Notice: Subject to any disclaimer, the term of this patent is extended or adjusted under 35 U.S.C. 154(b) by 248 days.

(21) Appl. No.: 17/228,956

(22) Filed: Apr. 13, 2021

(65) Prior Publication Data

US 2022/0327599 A1 Oct. 13, 2022

(51) Int. Cl.
*G06Q 10/02* (2012.01)
*G06Q 10/0631* (2023.01)
*G06Q 10/087* (2023.01)
*G06Q 30/0601* (2023.01)

(52) U.S. Cl.
CPC ......... *G06Q 30/0633* (2013.01); *G06Q 10/02* (2013.01); *G06Q 10/06312* (2013.01); *G06Q 10/087* (2013.01)

(58) Field of Classification Search
CPC .. G06Q 30/0633; G06Q 10/02; G06Q 10/087; G06Q 50/30
See application file for complete search history.

(56) References Cited

U.S. PATENT DOCUMENTS

| 2009/0216576 A1* | 8/2009 | Saeed | G06Q 10/06 705/348 |
| 2015/0120514 A1* | 4/2015 | Deshpande | G06Q 30/016 705/28 |
| 2015/0356479 A1* | 12/2015 | Palanisamy | G06Q 10/0637 705/7.36 |

(Continued)

FOREIGN PATENT DOCUMENTS

WO 2018057498 A1 3/2018

OTHER PUBLICATIONS

Ran, Wenxue, A Polling-Based Dynamic Order-Picking System considering Priority Orders, Jul. 24, 2020, Complexity, vol. 2020, Issue 1 (Year: 2020).*

*Primary Examiner* — Jeff Zimmerman
*Assistant Examiner* — Wayne S. Murray
(74) *Attorney, Agent, or Firm* — CHIP LAW GROUP

(57) ABSTRACT

A system and method for slot selection is provided. A customer order is received for an in-store pickup at a retail store and a set of inputs is received. The set of inputs includes slot-related information related to a first set of timeslots available at the retail store within a first timeperiod, inventory information, and order preparation constraints. Based on the set of inputs, a capacity constraint is determined. The capacity constraint sets a number of customer orders to be scheduled for the in-store pickup within each of the first set of timeslots. Thereafter, a first timeslot is determined from among the first set of timeslots. The first timeslot accommodates the customer order in accordance with the capacity constraint and a pickup wait time within the first timeslot is below a threshold. The first timeslot is displayed on a customer device.

19 Claims, 9 Drawing Sheets

(56) References Cited

U.S. PATENT DOCUMENTS

| | | | |
|---|---|---|---|
| 2016/0203543 A1* | 7/2016 | Snow | G06Q 30/0635 |
| | | | 705/26.81 |
| 2017/0220986 A1* | 8/2017 | Putcha | G06Q 20/102 |
| 2017/0337523 A1* | 11/2017 | Roach | G06Q 10/1097 |
| 2018/0189729 A1* | 7/2018 | Droege | G01C 21/3605 |
| 2020/0242553 A1* | 7/2020 | Zhang | G06N 3/08 |
| 2020/0357040 A1* | 11/2020 | Patel | G06Q 30/0639 |
| 2022/0245595 A1* | 8/2022 | Vasagiri | G06Q 10/0835 |

\* cited by examiner

Select A Slot For Pickup Of Order(Order ID 1234)

Available Set Of Slots:

| Feb 22, 2021 | 1PM - 1.30PM |
| Feb 23, 2021 | 3PM - 3:30PM |
| Feb 24, 2021 | 5:30PM - 6PM |
|              | 6PM - 6:30PM |
|              | 7PM - 7:30PM |

First (best) Slot: Feb 22, 2021; 3PM - 3:30PM
Second (earliest) Slot: Feb 22, 2021; 1PM - 1:30PM Select Slot:

| Feb 22, 2021 | 1PM - 1.30PM |
| Feb 23, 2021 | 3PM - 3:30PM |
| Feb 24, 2021 | 5:30PM - 6PM |
|              | 6PM - 6:30PM |
|              | 7PM - 7:30PM |

[Submit To Schedule Pick-Up On Selected Slot 604]

| S.No | Items in the order | Availability Status | Store Credit Points |
|---|---|---|---|
| 1. | Bread Loaf- 400 g*1 | Available | 0 |
| 2. | Eggs - 6 | Available | 0 |
| 3. | Milk – 2 litres | Available | 0 |
| 4. | Chocolate Crème Biscuits – 2 packets | Available | 0 |
| 5. | Hand-sanitizers- 250 ml*2 bottles | Available | 0 |
| 6. | Lipstick, Company L, color pink, style, 3- 2 nos. | Available | 0 |
| 7. | Night lamp -1 | Available | 0 |
| 8. | Antacid- 2 strips | Available | 0 |
| 9. | Diclofenac Pain Relief Gel – 1 tube | Available | 0 |
| 10. | Black gents-shoes with lace, style 2, size 10 – 1 pair | Available | 0 |
| 11. | Gents-socks, grey color, medium size – 1 pair | OUT OF STOCK | 5 |
| 12. | White shirt, gents, style 3, company X, size - 40" - 1 | Available | 0 |
| 13. | Headphones, company Y – 1 pair | Available | 0 |
| 14. | Power bank, company Z – 2 nos. | OUT OF STOCK | 25*2 = 50 |
| 15. | Analog wrist-watch, company R, style 4 - 1 | Available | 0 |
| | Total items out-of-stock | 2 Items | |
| | Total Store Credits Points Earned | 55 | |

SLOT SELECTION FOR PICKUP SCHEDULING AND ORDER FULFILLMENT

REFERENCE

None.

FIELD

Various embodiments of the disclosure relate to digital commerce. More specifically, various embodiments of the disclosure relate to a system and method of slot selection for pick-up scheduling and order fulfillment.

BACKGROUND

Advancements in digital commerce have led to an emergence of a large number of retail stores that accept orders online from customers. Such orders may typically be delivered at a delivery address of the customer or may be available for an in-store pickup at the retail store. After the order is placed or at the time of placing the order, the retail store may offer customers an option to pick up their orders from the retail store at certain pickup time or within a pickup time-window. Typically, all available pickup time windows or pickup times within a given duration (for example, next 7 days) may be presented to the customer as available options for an in-store pickup from the retail store. In many instances, the customer may select a pickup time window or a pickup time that may give less time to the retail store to prepare the order. In such instances, the preparation of order may be delayed. Even though the customer may arrive on time to pick up the order, the customer may end up waiting at the retail store for an extended period of time, which may affect an overall shopping experience of the customer.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method of slot selection for pick-up scheduling and order fulfillment is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 6 is a diagram that illustrates an example user-interface of a customer device for display of one or more timeslots, in accordance with an embodiment of the disclosure.

FIG. 7 is a diagram that illustrates an example scenario of processing of out-of-stock items of a customer order, in accordance with an embodiment of the disclosure.

DETAILED DESCRIPTION

Figure 1:
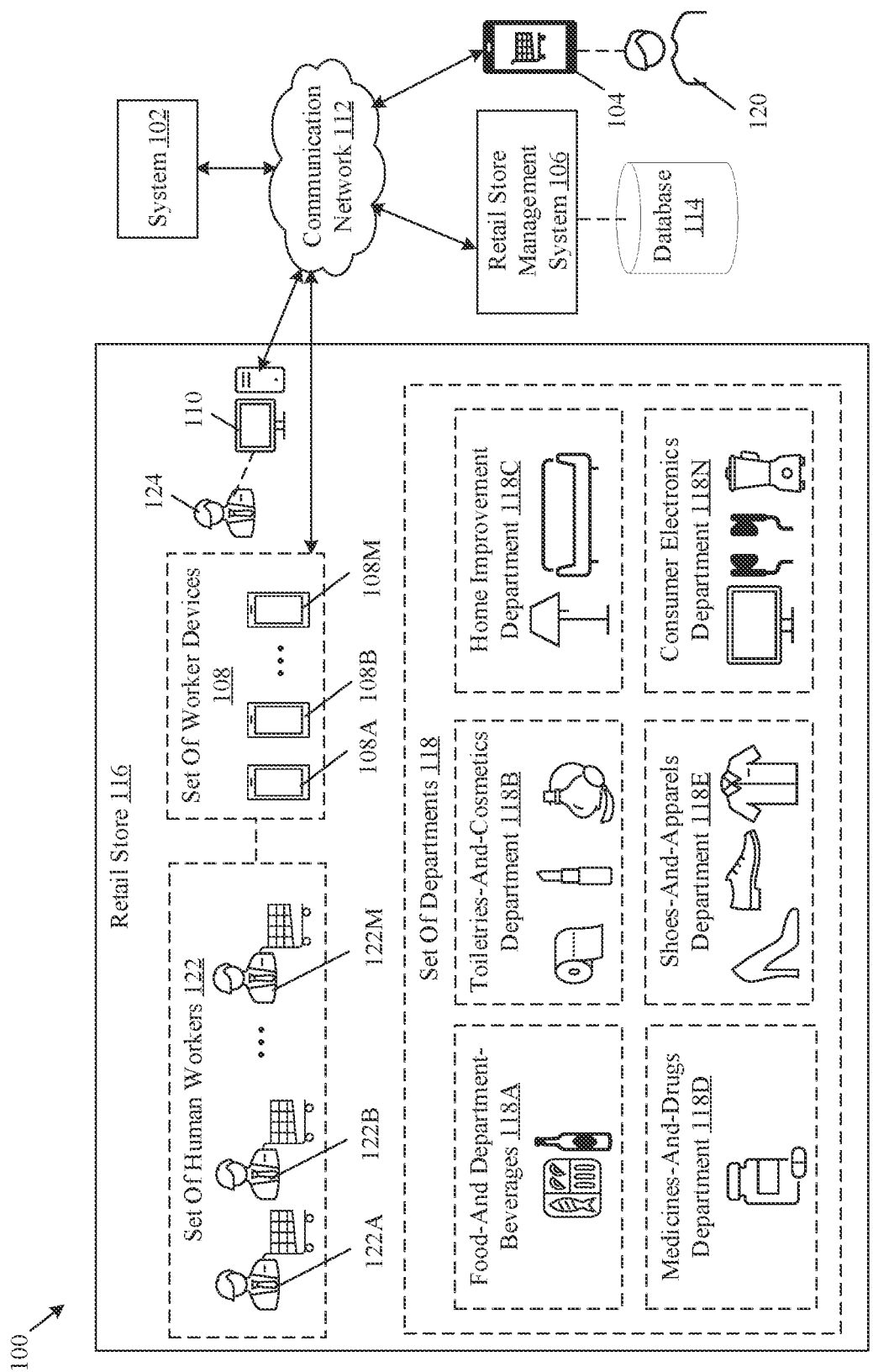
FIG. 1 is a block diagram that illustrates an exemplary network environment for slot selection and pick-up scheduling, in accordance with an embodiment of the disclosure.

The described implementations may be found in a disclosed system and method for slot selection for pick-up scheduling and order fulfillment. Exemplary aspects of the disclosure may include the system, such as, a cloud server, a group of cloud servers, a Software-as-a-Service (SaaS) application server, a distributed computing server, a mainframe system, a work-station, a personal computer, a mobile device, or any electronic computing-device. The system may receive a customer order from a customer device of a customer. The customer order may be for an in-store pickup of a set of items from a retail store.

The system may receive a set of inputs, including, but not limited to, slot-related information, inventory information, and order preparation information. The slot-related information may be related to a first set of timeslots, which may include a set of timeslots (e.g., a set of half hour or one hour time windows) available at the retail store within a first period (e.g., a certain day, week, or month). The inventory information may be related to items that may be sold by the retail store. The order preparation constraints may be related to a number of human workers who may work at or may be employed with the retail store and may service an order received by the retail store. The received set of inputs may further include a number of parking spots available for the in-store pickup. Further, the received set of inputs may include initial weights for objectives, such as, but not limited to, a first objective to maximize a service level for the received customer order above a service level threshold, and a second objective to maximize a resource utilization of the number of human workers within each of the first set of timeslots above a utilization threshold.

The system may determine a capacity constraint based on the received set of inputs. The capacity constraint may be indicative of a number of customer orders to be scheduled for the in-store pickup within each timeslot of the first set of timeslots. The system may determine a first timeslot (e.g., an optimum timeslot) from the first set of time slots. The first timeslot may accommodate the received customer order in accordance with the capacity constraint. Also, the pickup wait time within the first timeslot may be below a threshold (e.g., a few minutes, such as 2-5 minutes). The system may control the customer device to display the determined first timeslot.

The disclosed system may leverage the information related to resources available at the retail store and customer orders to determine pickup timeslots, which provide enough time to the workers at the retail store to prepare customer orders (before customers arrive at the pickup timeslots). Also, such timeslots may optimally reduce a pickup wait time for the customers within individual pickup timeslots. The disclosed system determines the first timeslot that may accommodate the customer's pickup order and may simultaneously be optimum for the retail store. For instance, resources, such as human workers at the retail store may be efficiently utilized. The disclosed system may enable the retail store to maximize resource utilization and service levels in an efficient manner. Also, the customer may not have to wait for extended period of time as the customer arrives to pick up the order in the first timeslot. This may enhance the customer's shopping experience with the retail store.

The disclosed system may also leverage historical order data (e.g. history of 1000 customer orders) of the retail store to train machine learning models and then use such trained models to predict pickup timeslots, which may further maximize the service levels and resource utilization.

FIG. 1 is a block diagram that illustrates an exemplary network environment for slot selection and pick-up scheduling, in accordance with an embodiment of the disclosure. With reference to FIG. 1, there is shown a network environment 100. The network environment 100 may include a system 102, a customer device 104, a retail store management system 106, a set of worker devices 108, a store manager device 110, and a communication network 112. The set of worker devices 108 may include a first worker device 108A, a second worker device 108B . . . and an Mth worker device 108M. The retail store management system 106 may be associated with a database 114. The system 102 may be communicatively coupled to the customer device 104, the retail store management system 106, the set of worker devices 108, and the store manager device 110, via the communication network 112.

There is further shown a block diagram of a retail store 116. The retail store 116 may include a set of departments 118, such as, but not limited to, a food-and-beverages department 118A, a toiletries-and-cosmetics department 118B, a home improvement department 118C, a medicines-and-drugs department 118D, a shoes-and-apparels department 118E, . . . and a consumer electronics department 118N. The set of departments 118 shown in FIG. 1 is presented merely as an example and should not be construed as limiting for the disclosure. The present disclosure may be applicable to other types of departments or sub-departments at a retail store. The description of other types of departments or sub-departments has been omitted from the disclosure for the sake of brevity. Also, the number of departments in FIG. 1 is presented merely as an example and should not be construed as limiting for the disclosure. The set of departments 118 may include more than or less than six departments, without departing from the scope of the disclosure.

The retail store 116 may be associated with a set of human workers 122. For example, the set of human workers 122 may be employed or contracted to work at the retail store 116 to service orders received by the retail store 116. The set of human workers 122 include a first human worker 122A, a second human worker 122B, . . . and an Mth human worker 122M. Each of the set of human workers 122 may operate one or more worker devices (of the set of worker devices 108). For example, the first human worker 122A may operate the first worker device 108A, the second human worker 122B may operate the second worker device 108B, and the Mth human worker 122M may operate the Mth worker device 108M. The retail store 116 may be further associated with a store manager 124. The store manager 124 may be responsible for performing several tasks, such as, but not limited to, managing the day-to-day operations of the retail store, supervising the set of human workers 122, overseeing inventory, and ensuring targets set by the retail stores are achieved to a certain extent. The store manager 124 may operate the store manager device 110. There is further shown a customer 120 who may operate the customer device 104 to orders items at the retail store 116.

The system 102 may include suitable logic, circuitry, interfaces, and/or code that may be configured to determine timeslots for an in-store pickup of orders placed (or about to be placed) at the retail store 116 within a given period. Such timeslots may be determined based on various types of information, such as slot-related information related to timeslots available at the retail store 116 within a period, inventory information related to items sold by the retail store 116, and order preparation constraints. Example implementations of the system 102 may include, but are not limited to, a cloud server (public, private, or hybrid), a distributed computing server or a cluster of servers, a Software-as-a-Service (SaaS) application server, an edge computing system that includes a network of distributed compute/edge nodes), a mainframe system, a work-station, a personal computer, or a mobile device.

In an exemplary embodiment, the system 102 may include a frontend subsystem and a backend subsystem. The frontend subsystem may be deployed on-premise or at a location of entities, such as retail stores (which may be registered with or connected to the system 102) and fulfillment centers (which may be associated with the retail stores or may operate independently). In an embodiment, the frontend subsystem may be a client-side application, accessible on worker devices, store manager devices, or on customer devices. The frontend subsystem may be configured to display a user interface (UI) which may include UI elements to allow customers, human workers, or store managers to provide inputs and view information related to orders or workers. The backend subsystem may include a server-side application, which may execute all instructions related to order scheduling and fulfillment for retail stores (registered with the system 102).

The customer device 104 may include suitable logic, circuitry, interfaces, and/or code that may be configured to enable a user (e.g., the customer 120) associated with the customer device 104 to place a customer order and to schedule the customer order for an in-store pickup at the retail store 116. In an embodiment, the customer device 104 may include a web client to access a client-side application or may include an installation of a software application. The client side application or the software application may include a user interface for the customer 120 to execute several tasks, such as, but not limited to, to place the customer order at the retail store 116, interact with the staff at the retail store 116, schedule/select timeslots for the in-store pickup, or to track a status of the placed customer order. Through the client-side application on the web-client or the software application, the customer device 104 may display a set of timeslots to choose from for the in-store pickup of the customer order. Examples of the customer device 104 may include, but are not limited to, a kiosk device, a computer work-station, a personal computer, a mobile phone, a smartphone, a cellular phone, a tablet computing device, a gaming device, a server, a mainframe machine, a consumer electronic (CE) device, or any computing device with an inbuilt or installed web-client or a software application associated with the retail store 116.

The retail store management system 106 may include suitable logic, circuitry, interfaces, and/or code that may be configured to enable a management of operations of one or more retails stores (e.g., the retail store 116) or a chain of retail stores. The retail store management system 106 may include a set of tools, such as, but not limited to, an inventory management system, a supply chain management system, a point-of-sale (PoS) management system, an order management system, an online marketing system, an e-commerce management system, an accounting management system, a customer relationship management (CRM) system, an enterprise resource planning (ERP) system, or a human resource (HR) management system. The retail store management system 106 may enable, for example, the retail store 116 to manage at least one of, but not limited to, an inventory of orders, customer orders, employee shifts/staffing, billing, and order preparation/fulfillment status of customer orders at with the retail store 116.

In an embodiment, the retail store management system 106 may be configured to use the database 114 to store information related to the retail store 116. Such information may be provided as a set of inputs to the system 102. The stored information may include, for example, slot-related information, inventory information, order preparation constraints, parking spot information, and the like. The stored information related to the set of inputs may further include a history of customer orders.

In one embodiment, the retail store management system 106 may be an on-premise system located at the facility of the retail store 116. In another embodiment, the retail store management system 106 may be located outside the retail store 116. For example, the retail store management system 106 may be an edge computing device, a fog-computing system (with at least one edge node located near the premises of the retail store 116), or a set of distributed computing devices. Alternatively, the retail store management system 106 may be a server (such as a cloud server). Other examples of the retail store management system 106 may include, but are not limited to, a SaaS application server, a database server, a distributed computing server, a mainframe system, a work-station, a personal computer, or a mobile device.

The set of worker devices 108 may include suitable logic, circuitry, interfaces, and/or code that may be configured to enable the set of human workers 122 to service the customer orders. In an embodiment, the set of worker devices 108 may include a web-client to access a client-side application or a pre-installed software application associated with the retail store 116. The client-side application or the software application may include a user-interface for human workers (e.g., the set of human workers 122) of the retail store 116. Through the web-client or the software application, each worker device (e.g., the first worker device 108A) may receive a notification from the system 102 and/or the store manager device 110. The notification may include a schedule for the servicing the customer order and a set of instructions for the human worker (e.g., the first human worker 122A) to service the customer order or a sub-order thereof. Through the web-client or the software application, the worker device (e.g., the first worker device 108A) may transmit a notification associated with the fulfillment of the customer order or a part of the customer order to the store manager device 110, the retail store management system 106 and/or the system 102. Examples of the set of worker devices 108 may include, but are not limited to, a kiosk device, a computer work-station, a personal computer, a mobile phone, a smartphone, a cellular phone, a tablet computing device, a gaming device, a server, a Point-of-Sale Device, a barcode reader, a mainframe machine, a consumer electronic (CE) device, or any computing device with capability to execute a web-client or a software application associated with the retail store 116.

The store manager device 110 may include suitable logic, circuitry, interfaces, and/or code that may be configured to display a user-interface, through which the store manager 124 may manage operations of the retail store 116. The operations of the retail store 116 may include, but are not limited to, assignment of tasks to the set of human workers 122 for servicing customer orders, order tracking, inventory management, sales, billing, logistics, and customer relationship management.

In an embodiment, the store manager device 110 may include a web-client to access a client-side application or a pre-installed software application associated with the retail store 116. The client-side application or the software application may include the user-interface for the store manager 124 of the retail store 116. Through the web-client or the software application, the store manager device 110 may receive a notification related to customer orders. For example, the notification may be related to the customer orders which may be placed at the retail store 116 within a specific period (for example, last 5 days) and are yet to be serviced or fulfilled. The notification may include details of the customer order and a schedule for the pickup of the customer order. Additionally, the notification may include a timeslot (and/or a servicing time) in which the customer order (or its suborders) can be serviced before the pickup schedule. Based on the received notification, the store manager device 110 may transmit a set of instructions associated with servicing of the customer order to one or more devices in the set of worker devices 108. Examples of the store manager device 110 may include, but are not limited to, a kiosk device, a computer work-station, a personal computer, a mobile phone, a smartphone, a cellular phone, a tablet computing device, a gaming device, a server, a mainframe machine, a consumer electronic (CE) device, or any computing device with capability to execute a web-client or a software application associated with the retail store 116.

The database 114 may be configured to store the information related to, for example, the retail store 116, customers of the retail store 116, and customer orders placed at the retail store 116. Such information may be used to provide a set of inputs to the system 102. The database 114 may be a relational or a non-relational database. The database 114 may be stored on a device, such as the retail store management system 106, the system 102, or a server different from the retail store management system 106 and the system 102. The device which stores the database 114 may be configured to receive a request from the system 102, through the communication network 112. Based on the received request, the device may be configured to retrieve the set of inputs from the database 114 and may transmit the set of inputs to the system 102, through the communication network 112.

The retail store 116 may be a physical store that may operate according to a BOPIS system (i.e. Buy Online, Pick-up in Store). For example, the retail store 116 may list items (which may include goods, services, or a combination thereof) available for sale at the retail store 116 (or at its warehouses or nearby stores chains), on a website, a web application, or a software application (such as a mobile application or a desktop application). The website or the web application may be accessed via a web-client and the software application may be installed on various customer devices. In addition to the BOPIS system, the retail store 116 may also operate according to other methods, such as buy online and get home delivery of orders. For example, a customer may choose to receive items in the customer order through a physical delivery option or an in-store pickup option. If the customer chooses the physical delivery option, one or more items purchased by the customer (such as the customer 120) may be shipped to the delivery address associated with the customer. If the customer chooses the in-store pickup option, the customer order may be prepared and provided to the customer at a physical location associated with the retail store 116. The physical location may be a location (such as a checkout counter or a drive through counter) within the premises of the retail store 116. Additionally, or alternatively, the physical location may include a set of parking spots at the retail store 116 or designated spots reserved by the retail store 116 for pick-up of serviced orders. In some instances, the retail store 116 may allow customers to add more items to a serviced customer order, while visiting the retail store 116 to pick-up the items of a serviced customer order.

The retail store 116 may be organized into different departments that may include one or more sub-departments for efficient servicing of the customer orders. For example, as shown in FIG. 1, the retail store 116 may include the set of departments 118, such as, but not limited to, the food-and-beverages department 118A, the toiletries-and-cosmetics department 118B, the home improvement department 118C, the medicines-and-drugs department 118D, the shoes-and-apparels department 118E, . . . and the consumer electronics department 118N.

The communication network 112 may include a communication medium through which the system 102 may be communicatively coupled to the customer device 104, the retail store management system 106, the set of worker devices 108, and the store manager device 110. Examples of the communication network 112 may include, but are not limited to, the Internet, a cloud network, a Wireless Fidelity (Wi-Fi) network, a Personal Area Network (PAN), a Local Area Network (LAN), or a Metropolitan Area Network (MAN), a mobile wireless network, such as a Long-Term Evolution (LTE) network (for example, $4^{th}$ Generation or $5^{th}$ Generation (5G) mobile network (i.e. 5G New Radio)). Various devices of the network environment 100 may be configured to connect to the communication network 112, in accordance with various wired or wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, Bluetooth (BT) communication protocols, or a combination thereof.

In operation, the customer device 104 may display a user-interface onto a display screen of the customer device 104. The user-interface may be accessed through a web client or may be a part of a software application pre-installed on the customer device 104. Through the displayed user-interface, the customer device 104 may receive a user input related to a purchase of a set of items from the retail store 116 using an in-store pickup option. The user input may be provided by the customer 120. Based on the received user input, a customer order may be generated and transmitted to the system 102. In this case, the customer order may be generated by the web client or the software application on the customer device 104. Additionally, or alternatively, the user input may be transmitted to the retail store management system 106, which may store the user input and generate the customer order. After the customer order is generated, the customer device 104 may be updated to display a message which may indicate that the customer order is placed. Also, the retail store management system 106 may transmit the customer order and/or details of the customer order to the system 102. The customer order may indicate a set of items purchased by the customer 120.

It should be noted that the process of placing a customer order through the customer device 104 may include several steps (such as item selection or payment) that are not mentioned in the foregoing description. A description of such steps is omitted from the disclosure for the sake of brevity.

The system 102 may be configured to receive the customer order from the customer device 104 (or the retail store management system 106) for an in-store pickup of the set of items at the retail store 116. The system 102 may be further configured to receive a set of inputs from the database 114, via the retail store management system 106. The received set of inputs may include, for example, slot-related information, inventory information, and order preparation constraints. The slot-related information may be related to a first set of timeslots (e.g., one or more free timeslots of half hour or one hour each) available at the retail store 116 within a first period (e.g., a day, a week, a month, or any specific period). The inventory information may be related to items sold by the retail store 116. For example, the inventory information may include information related to an identity and a quantity of different items available in each of the set of departments 118 and/or a warehouse associated with the retail store 116. The order preparation constraints may be related to a number of human workers (e.g., the set of human workers 122) at the retail store 116. For example, the order preparation constraints may include an average time that may be required by each human worker to service a sub-order of a certain size, including items associated with a certain department or sub-department of the retail store 116.

The system 102 may be configured to determine a capacity constraint based on the received set of inputs. The capacity constraint may set a number of customer orders to be scheduled for the in-store pickup within each timeslot of the first set of timeslots. In other words, the capacity constraint may be deterministic of the number of customer orders of a certain size that may be scheduled for in-store pickup in each timeslot of the first set of timeslots. After the determination of the capacity constraint, the system 102 may determine, from the first set of timeslots, a first timeslot that may accommodate the received customer order in accordance with the capacity constraint, and for which a pickup wait time within the first timeslot may be below a threshold.

The system 102 may be configured to control the customer device 104 to display the determined first timeslot. For example, the first timeslot may be displayed through the user-interface of the web-client or the software application of the customer device 104. The slot selection for pickup scheduling and order fulfilment is described further, for example, in FIGS. 3, 4, 5, 8, and 9. An example of the user-interface for the slot selection for pickup scheduling and order fulfilment is described further, for example, in FIG. 6. An example of issuance of store credit points to a customer on a non-availability of one or more items of a customer order is provided, for example, in FIG. 7. Various operations of the system 102 for the slot selection for pickup scheduling and order fulfilment are described further, for example, in FIGS. 3, 4, 5, and 8.

Figure 2:
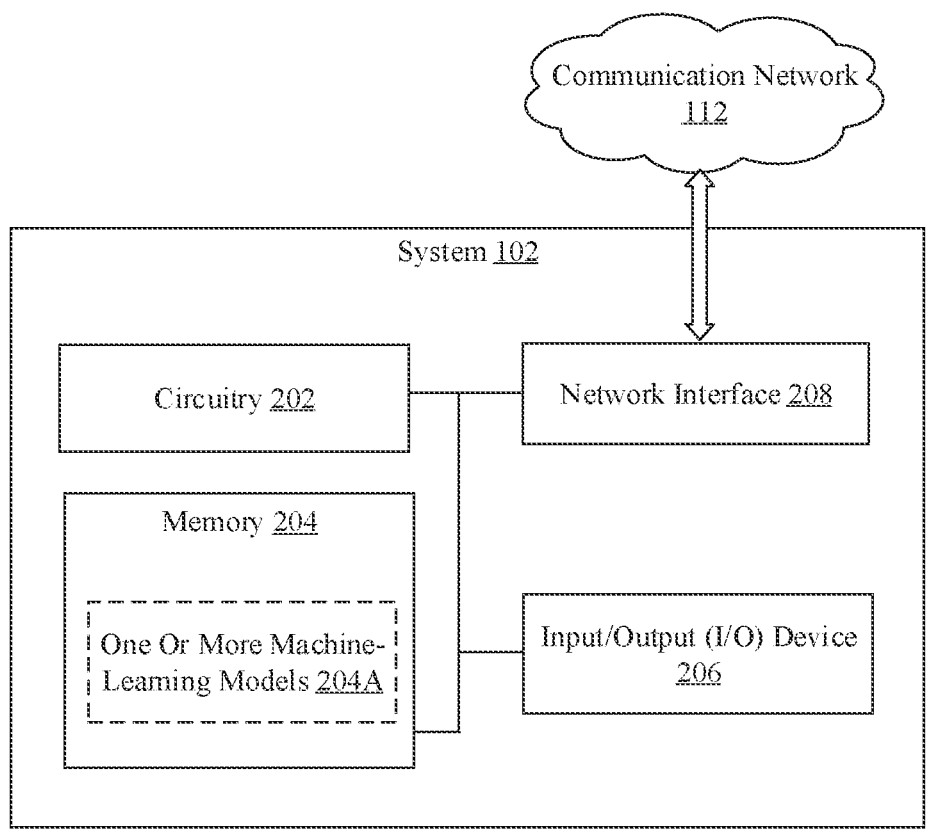
FIG. 2 is a block diagram that illustrates an exemplary system for slot selection, in accordance with an embodiment of the disclosure.

FIG. 2 is a block diagram that illustrates an exemplary system for slot selection, in accordance with an embodiment of the disclosure. FIG. 2 is explained in conjunction with elements from FIG. 1. With reference to FIG. 2, there is shown the system 102. The system 102 may include circuitry 202, a memory 204, an input/output (I/O) device 206, and a network interface 208. The memory 204 may store one or more machine-learning models 204A. The circuitry 202 may be communicatively coupled to the memory 204, the I/O device 206, and the network interface 208. The circuitry 202 may be configured to communicate with the customer device 104, the retail store management system 106, the set of worker devices 108, and/or the store manager device 110, by use of the network interface 208.

The circuitry 202 may include suitable logic, circuitry, and interfaces that may be configured to execute program instructions associated with different operations to be executed by the system 102. The circuitry 202 may be implemented based on a number of processor technologies known in the art. Examples of the processor technologies may include, but are not limited to, a Central Processing Unit (CPU), an x86-based processor, a Reduced Instruction Set Computing (RISC) processor, an Application-Specific Integrated Circuit (ASIC) processor, a Complex Instruction Set Computing (CISC) processor, a Graphical Processing Unit (GPU), a co-processor, or a combination thereof.

The memory 204 may include suitable logic, circuitry, and/or interfaces that may be configured to store a set of instructions executable by the circuitry 202. The memory 204 may be configured to store operating systems and associated applications. In accordance with an embodiment, the memory 204 may be also configured to store the one or more machine-learning models 204A. In addition, the memory 204 may also store the customer order that may be received from the customer device 104. Further, the memory 204 may store the set of inputs that may be received from the database 114, via the retail store management system 106. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

Each of the one or more machine-learning models 204A may be a model which may be trained to identify a relationship between inputs, such as features in a training dataset of a history of customer orders and output labels, such as timeslots selected for pickup of the customer orders. Each machine-learning model may be defined by its hyper-parameters, for example, number of weights, cost function, input size, number of layers, and the like. The hyper-parameters of each machine-learning model may be tuned before or after the training of the respective machine-learning models. In training, an input feature from a training dataset may be fed to a machine learning model and weights of the model may be updated based on a supervised learning algorithm. The weights may be iteratively updated until the loss associated with the model is below a threshold. After several epochs of the training on the features in the training dataset, each machine-learning model may be trained to output a result for a set of inputs. The result may include a predicted timeslot for slot selection for each input of the set of inputs. Examples of the one or more machine-learning models 204A may include, but is not limited to, a Support Vector Machine (SVM) model and a deep learning (DL) model (e.g., a deep neural network (DNN)).

The one or more machine-learning models 204A may include electronic data, which may be implemented as, for example, a software component of an application executable on the system 102. The one or more machine-learning models 204A may rely on libraries, external scripts, or other logic/instructions for execution by a processing device, such as, the circuitry 202. The one or more machine-learning models 204A may include code and routines configured to enable a computing device, such as, the circuitry 202, to perform one or more operations for prediction of a timeslot for slot selection. Additionally, or alternatively, the one or more machine-learning models 204A may be implemented using hardware including a processor, a co-processor, a microprocessor (e.g., to perform or control performance of one or more operations), a field-programmable gate array (FPGA), or an application-specific integrated circuit (ASIC). Alternatively, in some embodiments, the one or more machine-learning models 204A may be implemented using a combination of hardware and software.

The I/O device 206 may include suitable logic, circuitry, interfaces, and/or code that may be configured to receive an input from a user. The I/O device 206 may be further configured to provide an output to the user. The I/O device 206 may include various input and output devices, which may be configured to communicate with the circuitry 202. Examples of the input devices may include, but are not limited to, a touch screen, a keyboard, a mouse, a joystick, and/or a microphone. Examples of the output devices may include, but are not limited to, a display screen and/or a speaker.

The network interface 208 may include suitable logic, circuitry, code, and/or interfaces that may be configured to facilitate communication between the circuitry 202, the customer device 104, the retail store management system 106, the set of worker devices 108, and/or the store manager device 110, via the communication network 112. The network interface 208 may be implemented by use of various known technologies to support wired or wireless communication of the system 102 with the communication network 112. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), a $5^{th}$ generation network such as 5G new radio (NR) network, a 5G smart antenna, time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS). The network interface 208 may be capable to communicate with a 5G communication network and will include appropriate 5G support functionality such as, but not limited to, a 5G NR, a V2X Infrastructure, and a 5G Smart Antenna. Various operations of the circuitry 202 for the slot selection are described further, for example, in FIGS. 3, 4, 5, and 8.

Figure 3:
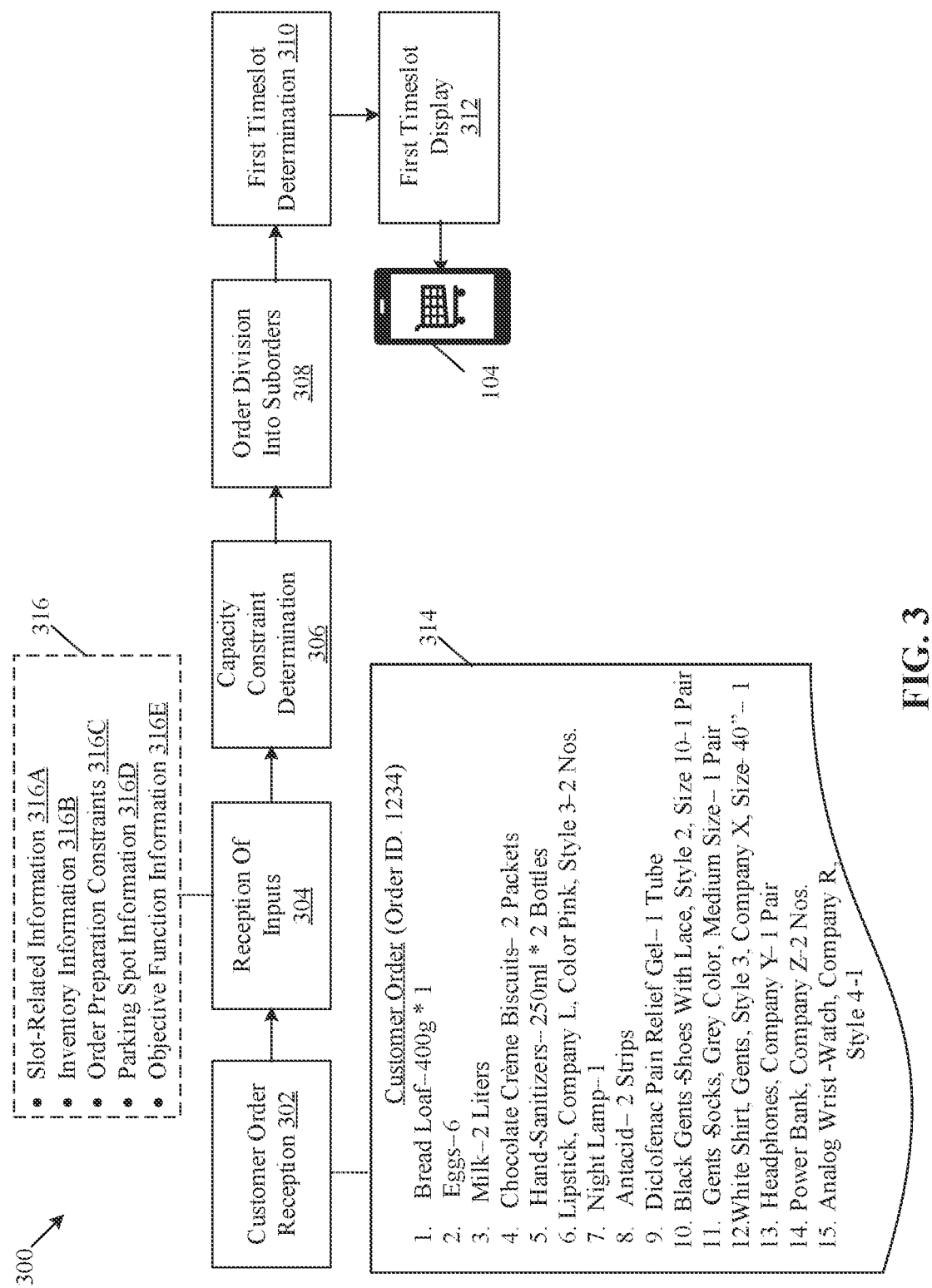
FIG. 3 is a diagram that illustrates an exemplary processing pipeline for slot selection and pickup scheduling, in accordance with an embodiment of the disclosure.

FIG. 3 is a diagram that illustrates an exemplary processing pipeline for slot selection and pickup scheduling, in accordance with an embodiment of the disclosure. FIG. 3 is explained in conjunction with elements from FIG. 1 and FIG. 2. With reference to FIG. 3, there is shown a processing pipeline 300 of operations from 302 to 312 to depict slot selection and pickup scheduling. The operations 302 to 312 of the processing pipeline 300 may be executed by any computing system, such as by the system 102 of FIG. 1 or the circuitry 202 of FIG. 2.

At 302, a customer order may be received. In an embodiment, the circuitry 202 may be configured to receive the customer order associated with a customer (for example, the customer 120). The customer order may be indicative of a set of items that may be purchased by the customer 120 or may be added in a digital cart for purchase. As shown, for example, a customer order 314 may be placed by the customer 120 and received by the circuitry 202. The customer order 314 may be identified by an order ID, such as "1234". The set of items in the customer order 314 may include, for example, bread, eggs, milk, chocolate crème biscuits, hand-sanitizers, lipsticks, a night lamp, antacid strips, a tube of diclofenac pain relief gel, a pair of gents shoes, a pair of gents socks, a white colored gents shirt, a pair of headphones, a set of power banks, analog wristwatch, and the like. Also, the customer order may be received from the customer device 104 for an in-store pickup of the set of items at the retail store 116.

The customer device 104 may transmit (directly or through the retail store management system 106) the generated customer order to the system 102. The circuitry 202 may receive the customer order from the customer device 104 (or from the retail store management system 106). In an embodiment, the circuitry 202 may be configured to process customer orders from a set of customers on a first-come-first-serve basis. In another embodiment, the circuitry 202 may assign a priority to the customer orders based on one or more of a membership or loyalty points of a customer with the retail store 116, a number of items in the customer order, an invoiced amount of the customer order, a location-based rule for the customers (who placed the orders), or a payment mode associated with the customer order.

At 304, a set of inputs may be received. In an embodiment, the circuitry 202 may be configured to receive the set of inputs from the retail store management system 106. The retail store management system 106 may retrieve the set of inputs from the database 114 and may transmit the retrieved set of inputs to the system 102. For example, a set of inputs 316 is shown. The set of inputs 316 may include, for example, slot-related information 316A, inventory information 316B, order preparation constraints 316C, parking spot information 316D, and objective function information 316E. The slot-related information 316A may be related to a first set of timeslots available at the retail store 116 within a first period (e.g., a day, a week, or a month). In an embodiment, the slot-related information 316A may include a number of timeslots available within the first set of timeslots on each day and a length of each timeslot of the first set of timeslots. For example, the slot-related information 316A may indicate that the first set of timeslots include a set of 12 timeslots of half hour each on a certain day (e.g., Feb. 22, 2021). Example of the first set of timeslots may include, but is not limited to, 11:00 AM-11:30 AM, 11:30 AM-12:00 PM, 12:00 PM-12:30 PM, 12:30 PM-1:00 PM, 2:00 PM-2:30 PM, 2:30 PM-3:00 PM, 3:00 PM-3:30 PM, 3:30 PM-4:00 PM, 5:00 PM-5:30 PM, 5:30 PM-6:00 PM, 6:00 PM-6:30 PM, and 6:30 PM-7:00 PM. The number of timeslots within the first set of timeslots may be set based on availability of time within a given working day for the retail store 116 to service customer orders and an average or median service time to service each customer order. For example, the first set of timeslots may be based one or more of operational hours of the retail store 116 (e.g., 10 AM-7:30 PM) and one or more timeslots assigned for miscellaneous activities, such as stock-taking, restocking, or auditing (e.g., 10 AM-11 AM and 7 PM-7:30 PM). The first set of timeslots may be further based on a duration of breaks taken on average by the set of human workers 122 at the retail store 116. For example, the breaks may include a first time interval (1 PM-2 PM) for lunch and a second time interval (4 PM-5 PM) for evening coffee.

The inventory information 316B may be related to the items sold by the retail store 116. For example, the inventory information 316B may include information related to an identity and a quantity of different items available in the each of the set of departments 118 and/or a warehouse associated with the retail store 116. In an embodiment, the inventory information 316B may include a database of the items sold by the retail store 116. For each of the items, the database of the items may include a unique product code (UPC) or an identifier, at least one of an item weight or an item volume, an item quantity, and a department to which the respective time may belong. For example, the UPC code of an item may be a 12-digit identification code of the item. The weight or volume of a unit quantity of the item may be, for example, 2 lbs, 16 oz, or 750 ml. The quantity of the item may be, for example, a single bundle of a pack of 6 units. The department of the item may be, for example, the food-and-beverages department 118A. In the food-and-beverages department 118A, the sub-department of the item may be dairy products (e.g., dairy products aisle). The inventory information 316B may be used to identify a first set of items of the customer order and to check if such items are available in the inventory. Also, the inventory information 316B may be used to determine if a second set of items of the customer order is out-of-stock. Based on a UPC of each item in the inventory information 316B, the circuitry 202 may identify each item in the customer order and determine information indicative of the department of each item in the customer order.

The order preparation constraints 316C may be related to a number of human workers (such as, the set of human workers 122) at the retail store 116. For example, the order preparation constraints may include an average time or a median time that may be required by each human worker to service a sub-order of a certain size, including items associated with a certain department or sub-department of the retail store 116. In an embodiment, the order preparation constraints 316C may include, but not limited to, a number of the human workers (in the set of human workers 122) who may be available in each timeslot of the first set of timeslots, a number of hours that each of the human workers (in the set of human workers 122) may work in a day, and a median time to fulfil an average customer order or suborder. For example, 3 human workers may be assigned to work in each of the set of departments 118 and in each of the 12 timeslots between 11 AM to 7 PM. Each human worker in the set of human workers 122 may work for a total of 6 hours in the 12 timeslots to service customer orders.

The number of hours a human worker may be assigned to a department in a day may be used to assign tasks associated with servicing of the customer orders or suborders related to the department. Also, the number of human workers available in each timeslot and the number of hours that each human worker may work in the day may be used to assign tasks associated with servicing of the customer orders to each human worker (in the set of human workers 122). In some scenarios, there may be variations in the number of customer orders and the availability of the human workers on a given day or within a given period. For example, even though the working hours for each human worker may be predetermined (e.g., 6 hours), the availability of the human workers may be vary as one or more human workers may be unavailable due to personal work or health reasons for a certain duration in the day.

The median time to fulfil an average customer order or suborder may be a useful statistic to assign tasks to the set of human workers 122 as a median value in a dataset may be robust to outliers. As an example, the median time to fulfil the average customer order may be 20 minutes. In certain cases, the order preparation constraints 316C may include a first median time associated with fulfilment of a small order (e.g., an order of a size less than a threshold (such as 5 items)) and a second median time associated with fulfilment of a large order (e.g., an order of a size greater than a threshold (such as 20 items)). As an example, the first median time may be 12 minutes and the second median time may be 25 minutes.

The parking spot information 316D may include a number of parking spots which may be available for the in-store pickup within a given duration (for example, a duration of an average pickup timeslot). The availability of parking spots may vary at the retail store 116 based on various factors, such as a time of day, a number of orders to be picked up at the time of day or within the given duration, and/or a number of customers at the retail store 116 for in-store purchase.

The objective function information 316E may include initial weights (or relative weights) for objectives, such as, but not limited to, a first objective to maximize a service level for the received customer order above a service level threshold, and a second objective to maximize a resource utilization of the number of human workers within each of the first set of timeslots above a utilization threshold. The maximization of the service level for the received customer order may imply that the customer order is serviced in an assigned timeslot for the servicing of the customer order. For example, the expectation of the customer 120 may be met or even exceeded if the customer order is ready for pickup at the retail store 116 or at a parking spot of the retail store 116 before or at the start of a half hour timeslot booked by the customer 120 for the order pickup.

The second objective may be met based on a maximum utilization of the resources (e.g., the set of human workers 122 and/or the store manager 124) of the retail store 116. For example, the resources associated with the retail store 116 may include 6 human workers and a single store manager who may collaborate with the 6 human workers to service 2-3 customer order in every 30 minute timeslot on a typical day. If the resources associated with the retail store 116 are able to service 10 customer orders in every 30 minute timeslot and there are not enough additional man-hours to handle $11^{th}$ customer order (however small the customer order may be), then the utilization of the resources may be said to be maximized.

At 306, a capacity constraint may be determined. In an embodiment, the circuitry 202 may be configured to determine the capacity constraint based on the set of inputs 316. In an embodiment, the capacity constraint may set the number of customer orders to be scheduled for the in-store pickup within each timeslot of the first set of timeslots. For example, based on the slot-related information 316A, the available set of timeslots and the length of each timeslot associated with the available set of timeslots during a day in the operational hours of the retail store 116 may be determined. The order preparation constraints 316C may be used to determine an available number of man-hours associated with the set of human workers 122 for servicing of the customer orders within the first period (for e.g., a day). The order preparation constraints 316C may also be used to determine a utilization and a productivity of the set of human workers 122 within the first period. In addition, the parking spot information 316D may be used to determine a number of customers that may be accommodated at any given time in a timeslot based on the number of available parking spots associated with the retail store 116 within the first period.

In an embodiment, the capacity constraint may be determined based on one of more of the first set of timeslots, the available number of man-hours during the first period, an expected utilization of the set of human workers 122 in the first period, an expected productivity (in terms of a median service time) of the set of human workers 122 in the first period, and a number of available parking spots associated with the retail store 116. In another embodiment, the capacity constraint may be determined by solving an optimization problem which includes parameters, such as, but not limited to, the first set of timeslots, the available number of man-hours during the first period, an expected utilization of the set of human workers 122 in the first period, an expected productivity (in terms of a median service time) of the set of human workers 122 in the first period, and a number of available parking spots associated with the retail store 116.

At 308, the customer order may be divided into suborders. In an embodiment, the circuitry 202 may be configured to divide the customer order into the suborders based on a number of departments (e.g., the set of departments 118) at the retail store 116. The division of the customer order into the suborders may be based on the inventory information 316B. By way of example, and not limitation, the inventory information 316B may include the UPC code of each item. The UPC code may be used to identify the department and/or sub-department to which the respective item belongs.

For example, the customer order 314 may be divided into six suborders based on the set of items in the customer order 314 and individual departments (in the set of departments 118) to which the set of items may belong. The six suborders of the customer order 314 may include a first suborder associated with the food-and-beverages department 118A, a second suborder associated with the toiletries-and-cosmetics department 118B, a third suborder associated with the home improvement department 118C, a fourth suborder associated with the medicines-and-drugs department 118D, a fifth suborder associated with the shoes-and-apparels department 118E, and a sixth suborder associated with the consumer electronics department 118N. As shown, for example, the first suborder may include bread loaf, eggs, milk, and chocolate crème biscuits, and the second suborder may include hand-sanitizers and lipsticks. Further, the third suborder may include night lamp and the fourth suborder may include antacid strips and a tube of diclofenac pain relief gel. The fifth suborder may include a pair of gent's shoes, a pair of gent's socks, and a white colored gent's shirt. The sixth suborder may include a pair of headphones, a set of power banks, and an analog wrist-watch.

At 310, a first timeslot may be determined. In an embodiment, the circuitry 202 may be configured to determine a first timeslot that accommodates the received customer order (such as the customer order 314) in accordance with the determined capacity constraint (at 306). Also, the first timeslot may be a timeslot for which a pickup wait time within the first timeslot may be below a threshold. The first timeslot may be determined from the first set of timeslots. For example, if the capacity constraint sets five orders per timeslot, then the first timeslot may be determined for the customer order only if the first timeslot has enough capacity to accommodate at least one more customer order. Also, it may be determined whether the pickup wait time of the customer 120 within the determined first timeslot is below a threshold (for example, a few minutes or 10% of the duration of the first timeslot). The determination of the first timeslot may be such that both the first objective (i.e., the maximization of the service level for the received customer order) and the second objective (i.e., the maximization of the resource utilization of the number of the human workers) are satisfied.

In an embodiment, the first timeslot may be determined based on optimization of an objective function, which may be formulated based on the first objective and the second objective. The use of the objective function to determine the first timeslot may be referred as a policy-based optimization (as described, for example, in FIG. 4). In another embodiment, the one or more machine-learning models 204A may be trained on a history of customer orders at the retail store 116, for a prediction of the first timeslot. Once trained, the one or more machine-learning models 204A may be used for a determination of the first timeslot. The training and use of the machine-learning model for the determination of the first timeslot is described further, for example, in FIG. 8.

The first timeslot may be most optimal from among the first set of timeslots as the first timeslot may maximize the service level and the resource utilization of the set of human workers 122 of the retail store 116. If the customer (such as the customer 120) chooses the first timeslot for the in-store pickup, then the retail store 116 may be able to service a greater number of customer orders in the first set of timeslots (within the first period). Also, the first timeslot may be suitable for the customer 120 as the customer 120 may have to wait for a minimal amount of time (which is below a threshold) for the pickup of the customer order from the retail store 116. For instance, the customer 120 may receive the items of the customer order within first 5 minutes of 11 AM-11:30 AM timeslot (which may be the first timeslot).

At 312, the first timeslot may be displayed. In an embodiment, the circuitry 202 may be configured to control the customer device 104 to display the determined first timeslot. The circuitry 202 may transmit information associated with the first timeslot to the customer device 104 (as shown in FIG. 3) and may control the user-interface of the web client or the software application of the customer device 104 to display the first timeslot. An example of a user-interface to display the first timeslot on the customer device 104 is provided, for example, in FIG. 6.

Figure 4:
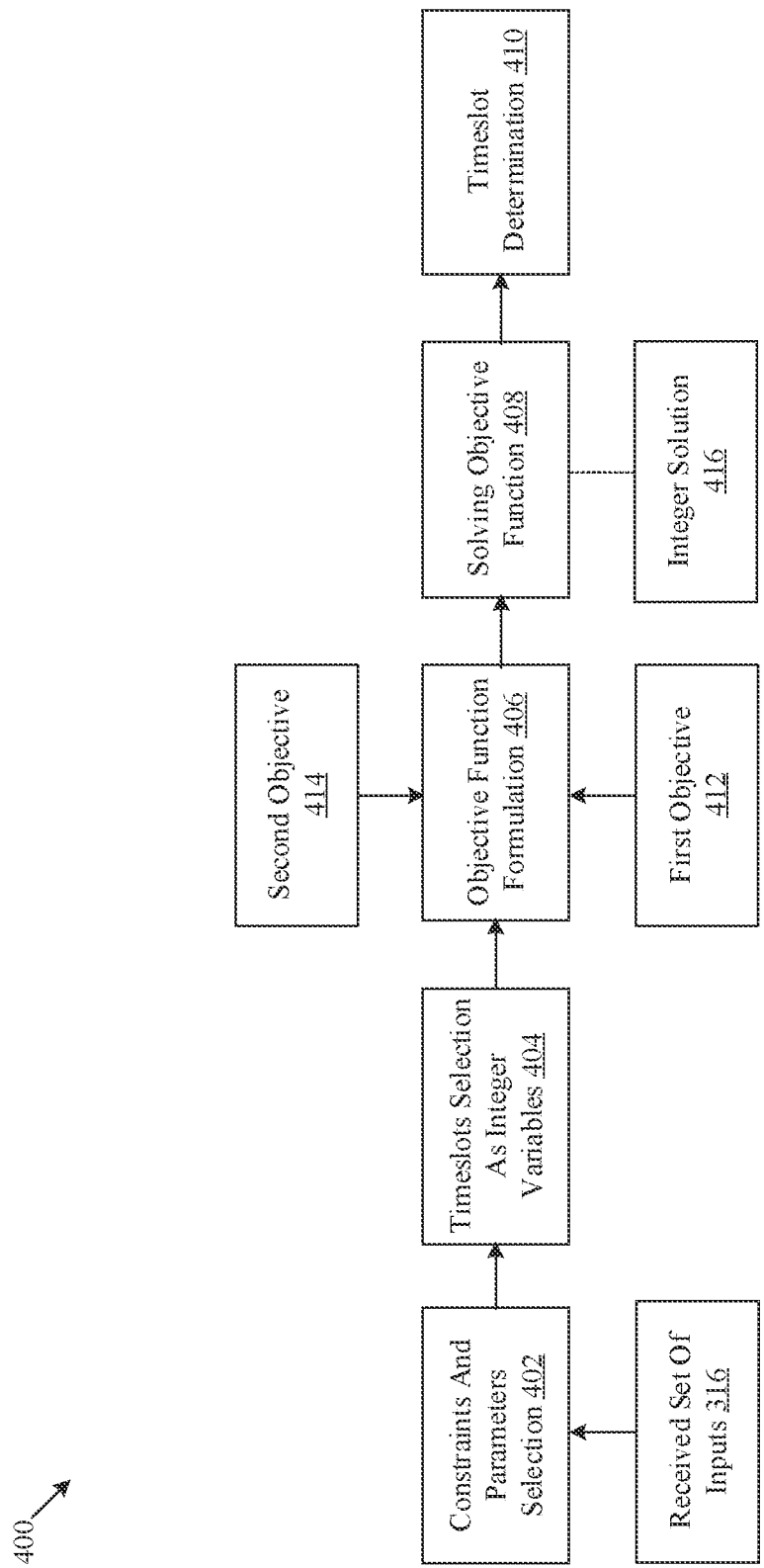
FIG. 4 is a diagram that illustrates an exemplary processing pipeline for determination of a first timeslot based on a policy-based optimization, in accordance with an embodiment of the disclosure.

FIG. 4 is a diagram that illustrates an exemplary processing pipeline for determination of a first timeslot according to a policy-based optimization, in accordance with an embodiment of the disclosure. FIG. 4 is explained in conjunction with elements from FIG. 1, FIG. 2, and FIG. 3. With reference to FIG. 4, there is shown a processing pipeline 400 of operations from 402 to 410 to depict determination of the first timeslot (as also determined at 310 of FIG. 3) based on the policy-based optimization. The operations 402 to 410 of the processing pipeline 400 may be executed by any computing system, such as by the system 102 of FIG. 1 or the circuitry 202 of FIG. 2.

At 402, constraints and parameters of an optimization problem may be selected. In an embodiment, the circuitry 202 may be configured to select the constraints and parameters of the optimization problem (associated with the policy-based optimization) based on the received set of inputs (for example, the set of inputs 316). In an embodiment, the optimization problem may be a stochastic optimization problem.

By way of example, and not limitation, based on the slot-related information 316A, timeslots available in the first period and the length of each timeslot may be determined. The first period may be a time period (e.g., upcoming 5 days) which may be offered to the customer 120 to select a timeslot for the pickup of the customer order. The first set of timeslots may be examples of such timeslots available in the first period. The circuitry 202 may maintain a queue of received set of customer orders based on a time of receipt of each of the set of customer orders. Further, the circuitry 202 may maintain a queue of timeslots that have already been allocated for pickup of one or more of the received set of customer orders. Thus, the customers may be allocated timeslots on a first-cum-first-serve basis based on an availability of the timeslots from the first set of timeslots. Based on the order preparation constraints 316C, the available number of man-hours within the first period, the expected utilization of the set of human workers 122 within the first period, and the expected productivity of the set of human workers 122 within the first period may be determined. In addition, based on the parking spot information 316D, the number of available parking spots associated with the retail store 116 (within the first period) may be determined.

In an embodiment, the constraints of the optimization problem may be selected based on one or more of, but not limited to, available timeslots (e.g., the first set of timeslots) within the first period, the available number of man-hours within the first period, the utilization of the set of human workers 122 within the first period, the productivity of the set of human workers 122 within the first period, and the number of available parking spots associated with the retail store 116 within the first period. Further, the parameters of the optimization problem may be selected based on one or more of, but not limited to, a threshold associated with the pickup wait time within a timeslot, a service level threshold for each customer order, and a utilization threshold associated with resource utilization of the set of human workers 122 of the retail store 116.

At 404, the first set of timeslots may be selected as integer variables of the optimization problem. In an embodiment, the circuitry 202 may be configured to select the first set of timeslots as the integer variables of the optimization problem. For example, each integer variable may correspond to at least one timeslot (of the first set of timeslots).

At 406, an objective function may be formulated. In an embodiment, the circuitry 202 may be configured to formulate the objective function of the optimization problem based on the integer variables (selected at 404) and the selected constraints and parameters (selected at 402). In an embodiment, the objective function may include, but is not limited to, a first objective 412 (e.g., an objective $G_1$) to maximize a service level for the received customer order, and a second objective 414 (e.g., an objective $G_2$) to maximize a resource utilization of the number of human workers (e.g., the set of human workers 122) within each of the first set of timeslots. As an example, the first objective 412 may be used to maximize the service level for the customer order above a service level threshold of 90% or above. Similarly, the second objective 414 may be used to maximize the resource utilization of the set of human workers 122 within each of the first set of timeslots above a utilization threshold of 95% or above.

For example, consider that the retail store 116 receives a set of customer orders represented by O (where, O={$O_i$}), which may be required to be scheduled for pick-up from the retail store 116. Further, consider that the first set of timeslots available for the customers of the retail store 116 may be represented by timeslots, S (where, S={$S_j$}). The first set of timeslots may include one or more timeslots from a current day and may also include one or more timeslots from future days. The circuitry 202 may use a set of binary decision variables to model the timeslot selection, which may be represented by expression (1), as follows:

$$x_{ij} = \begin{cases} 1, & \text{if order } O_i \text{ is scheduled for timeslot } S_j, \text{ and} \\ 0, & \text{otherwise} \end{cases} \quad (1)$$

Consider that $\mathbb{E}(t_{ij})$ represents an expected time to complete a customer order $O_i$ in a timeslot $S_j$. The service level of a customer order may be based on whether the customer order is suitable (e.g., based on a customer's preference) for a timeslot in which the customer order is assigned and a time required to service the customer order within the timeslot. The circuitry 202 may determine a first objective function associated with the first objective 412 (i.e., the objective $G_1$) to maximize the service level for the received customer order. The first objective function may be represented by expression (2), as follows:

$$F_{G_1} = \sum_{O_i \in O} \sum_{S_j \in S} w_{ij} x_{ij} + \lambda_1 \left( \sum_{O_i \in O} \sum_{S_j \in S} (T_j - E(t_{ij})) x_{ij} \right) \quad (2)$$

where,
$F_{G_1}$ may represent the first objective function,
$w_{ij}$ may be a weight (where, $w_{ij} \geq 0$) that may indicate a degree of suitability of the customer order $O_i$ in the timeslot $S_j$,
$T_j$ may represent a length of the timeslot $S_j$, and
$\lambda_1$ may be a parameter (where, $\lambda_1 \geq 0$) that may indicate a relative importance of the suitability of the selected timeslot and a time in which the customer order may be serviced in the timeslot.

In an embodiment, the circuitry 202 may maximize the first objective function and thereby maximize the first objective 412 (i.e., the objective $G_1$). A timeslot with a higher weight may be more likely to be selected than another timeslot with a lower weight. In an embodiment, the weights (i.e., $w_{ij}$) may be set based on preferences associated with the customer who may place the order $O_i$. Also, the weights (i.e., $w_{ij}$) may depend on a size (e.g., a number of items) associated with the order $O_i$ and a complexity (e.g., a number of suborders or departments) associated with the order $O_i$. The preferences associated with the customer (e.g., the customer 120) may be received as a user input through a customer-device (e.g., the customer device 104) associated with the customer. In an example, the customer 120 may prefer his/her order to be serviced as soon as possible, for example, in an earliest available timeslot. In such a case, the circuitry 202 may set a weight (e.g., $w_{i,1}$) for the first or earliest available timeslot (e.g., $S_1$) as largest among all the weights. For example, the weight $w_{i,1}$ may be set as 10. Weights for remaining timeslots (e.g., $S_2$, $S_3$ ... $S_n$) may be set to progressively smaller values such that the lowest value (e.g., 0.001) is assigned to last timeslot (e.g., $S_n$). In scenarios where a choice of a preferred timeslot of the customer 120 is unavailable, the circuitry 202 may set weights for the timeslots as progressively smaller values (similar to as described in the foregoing description).

As another example, a user input associated with the customer 120 may indicate that the customer 120 wishes to pick-up the order (e.g., order $O_3$) on a certain day such as Sunday. In such a case, the circuitry 202 may set weights (such as $w_{3,j}$) for all timeslots (e.g., $S_j$) available on Sundays as 10 and set remaining weights (e.g., $w_{3,j'}$) for timeslots (e.g., $S_{j'}$) on other days as 0. As another example, a user input associated with the customer 120 may indicate that the customer 120 wishes to pick-up the order (e.g., order $O_4$) in any timeslot within 5 PM-7 PM time window, instead of any timeslot in 3 PM-5 PM time window. If the user input indicates timeslots in 5 PM-7 PM time window are unavailable, the customer 120 may have to pick-up the order in one of the timeslots within 3 PM-5 PM time window. In this case, the circuitry 202 may set weights (e.g., $w_{4,j}$) for all timeslots (e.g., $S_j$) in 5 PM-7 PM time window as 10 and set weights (e.g., $w_{i,j'}$) for all timeslots (e.g., $S_j$) in 3 PM-5 PM time window to a lower value (e.g., 6).

As another example, an order (e.g., an order $O_2$) of the customer 120 may include a suborder that may have to be serviced in advance, for example, in an earlier time window (such as a timeslot prior to 5 PM). The suborder may be, for example, a "meat-cut" suborder that may require a human worker associated with 12 PM-5 PM work-shift to service the suborder. In such a case, the circuitry 202 may set weights (e.g., $w_{2,j}$) for all timeslots ($S_j$) in 12 PM-5 PM time window as 10 and set weights (e.g., $w_{2,j'}$) for all timeslots ($S_{j'}$) in other time windows to a lower value (e.g., 6).

In an embodiment, the expected completion time (i.e., $\mathbb{E}(t_{ij})$) may be based on at least one of a median service time for orders of a size of the order $O_i$, a number and types of suborders for the order $O_i$, or an availability of a certain human worker in a timeslot $S_j$ for suborders associated with a department. For example, an order $O_3$ may include 8 grocery store items. Each of the 8 grocery store items may be pre-packaged and may be added to an order cart by a human worker. For example, a bar code of each item may be scanned by the human worker and added to the order cart.

In an example scenario, the order $O_3$ may include cereal boxes, a wheat flour bag, a loaf of bread, and the like. If a human worker is available in a timeslot $S_5$ to service the order $O_3$ and a median rate at which he/she may pack items is 2 items per minute, then the expected completion time ($\mathbb{E}(t_{3,5})=8*(\frac{1}{2})$) may be 4 minutes. In another example scenario, an order $O_4$ may include same grocery store items (i.e., a suborder of 8 grocery items) as the order $O_3$ but may additionally include an item associated with a meat suborder. The meat suborder may be serviced in a median time of 10 minutes in the timeslot $S_5$. As the meat suborder may require a longer service time than the grocery store suborder (i.e., 4 minutes), the expected completion time ($\mathbb{E}(t_{4,5})$) may be 10 minutes.

In an embodiment, the $T_j$ values may be pre-determined for the retail store 116. For example, if $T_6$ equals 1 hour, the corresponding timeslot $S_6$ may be an hour long. The $T_j$ values may be determined based on the slot-related information 316A. The second term of the first objective function (of expression (2)) may maximize a time left in the selected timeslot after the customer order is serviced (as determined by $T_j - \mathbb{E}(t_{ij})$). In other words, the second term minimizes an expected time that the customer 120 may be required to wait in case the customer 120 arrives at the retail store 116 at the start of the selected timeslot to pick up the order.

In an embodiment, the parameter $\lambda_1$ may be used to weigh the two terms of the first objective function of expression (2) with respect to each other. In case minimization of the expected wait time has a higher priority than a maximization of the number of orders to be serviced for the retail store 116, then $\lambda_1$ may be set to have a higher value (such as 100). In case the maximization of the number of orders to be serviced has a higher priority than the minimization of the expected wait time, then $\lambda_1$ may be set to have a lower value (such as 0.01).

The circuitry 202 may determine a second objective function associated with the second objective 414 (i.e., the objective $G_2$) to maximize the utilization of the resources available at the retail store 116. Based on the maximization of the utilization of the resources at the retail store 116, a number of orders serviced within all timeslots in a planning horizon may be maximized. The second objective function may be represented by expression (3), as follows:

$$F_{G_2} = \sum_{O_i \in O} \sum_{S_i \in S_H} x_{ij} \quad (3)$$

where, $F_{G_2}$ may represent the second objective function, and
$S_H$ may represent the set of all timeslots in a time horizon for which the retail store 116 may plan, e.g., next 3 days, 1 week, or 10 days.

The availability of resources (e.g., the available number of timeslots and the number of human workers available in each department of the retail store 116 per timeslot) may be captured through the constraints and parameters of the first objective function and the second objective function, or a combination of the two objective functions. The circuitry 202 may formulate a combined objective function using the first objective function and the second objective function and may maximize the combined objective function. The combined objective function may be represented by $\alpha F_{G_1} + \beta F_{G_2}$, where $\alpha$ and $\beta$ may be weights associated with the first objective function and the second objective function in the combined objective function. By way of example, and not limitation, if the primary objective of the retail store 116 is to maximize the total number of orders serviced, then a may be set to 1 and $\beta$ may be set to 10 in the combined objective function. The objective function information 316E may include the initial weights (such as, $w_{ij}$, $\lambda_1$, $\alpha$, and $\beta$) for the first objective 412 and the second objective 414.

At 408, the formulated objective function may be solved. In an embodiment, the circuitry 202 may be configured to solve the formulated objective function. The circuitry 202 may be configured to generate an integer solution (e.g., an integer solution 416) of the optimization problem based on solving the objective function (e.g., the combined objective function, or each of the first objective function and the second objective function) using a Mixed-Integer Non-Linear Programming (MINLP) approach. In an embodiment, the MINLP approach may be a Stochastic Mixed-Integer Non-Linear Programming (S-MINLP) approach that may be captured through one or more known probability distributions. Examples of techniques that may be used to solve the objective function through the MINLP approach may include, but are not limited to, an outer approximation technique, a generalized Bender's decomposition technique, or a branch-and-bound technique. In an embodiment, the circuitry 202 may use a linear approximation of the non-linear functions, wherever applicable. In such a case, the objective function may be optimized through a Mixed-Integer Linear Program (MILP) approach.

At 410, the first timeslot may be determined. In an embodiment, the circuitry 202 may be configured to determine the first timeslot based on the solution of the optimization problem (as obtained at 408). By way of example, and not limitation, if solution of an integer variable $(x_{1,j})$ is 1, then the corresponding timeslot $(S_j)$ may be selected as the first timeslot and may be displayed on the customer device 104 as a recommended option for the in-store pickup. Whereas, if the solution of the integer variable $(x_{1,j})$ is 0, then the corresponding timeslot $(S_j)$ may be ignored for the customer order. Thus, if the solution of the optimization problem is the integer solution 416, which includes $x_{1,5}$ as 1, then a corresponding half hour timeslot ($S_5$=3:00 PM-3:30 PM) may be determined as the first timeslot.

In an embodiment, in case of a change in the set of inputs 316 or receipt of new orders, the first timeslot may be re-evaluated dynamically. The first timeslot may be re-evaluated for change of any input or receipt of each new order in an online manner. In an example, a human worker of a certain department of the retail store 116 may call-in sick at the start of a day while orders may be already scheduled for the day. In such a case, suborders for that department from all orders scheduled for the particular day may be re-assigned to other human workers associated with the particular department. The re-assignment for order servicing may be executed such that there may be minimal changes to the initial timeslot assignments (i.e., the initially determined first timeslot). However, in case a timeslot assignment for any order is modified, the concerned customer (e.g., the customer 120) may be notified on a customer-device (e.g., the customer device 104) of the customer 120. In another example, an item from an order (e.g., order $O_3$) may be initially determined to be out-of-stock. In case a customer (e.g., the customer 120) associated with the order (i.e., order $O_3$) agrees to a substitute item instead of the out-of-stock item, the next available substitute item may be picked. Typically, such item substitution may not require a change in the pickup timeslot for the order. However, in certain scenarios, through the customer device 104, the customer 120 may provide a user input indicative of customer's preference to be notified in case an item of the order is out-of-stock. Based on the user input and the identification of an out-of-stock item, the customer 120 may be notified on the customer device 104. The notification may enable the customer 120 to provide instructions as to how to handle the particular out-of-stock item. Other suborders of the order $O_3$ may be serviced as initially scheduled. Based on instructions from the customer 120 through the customer device 104, the out-of-stock item may be handled and the final pickup slot for the order may be updated. Again, the customer 120 may be notified on the customer device 104 about the update of the final pickup slot.

Figure 5:
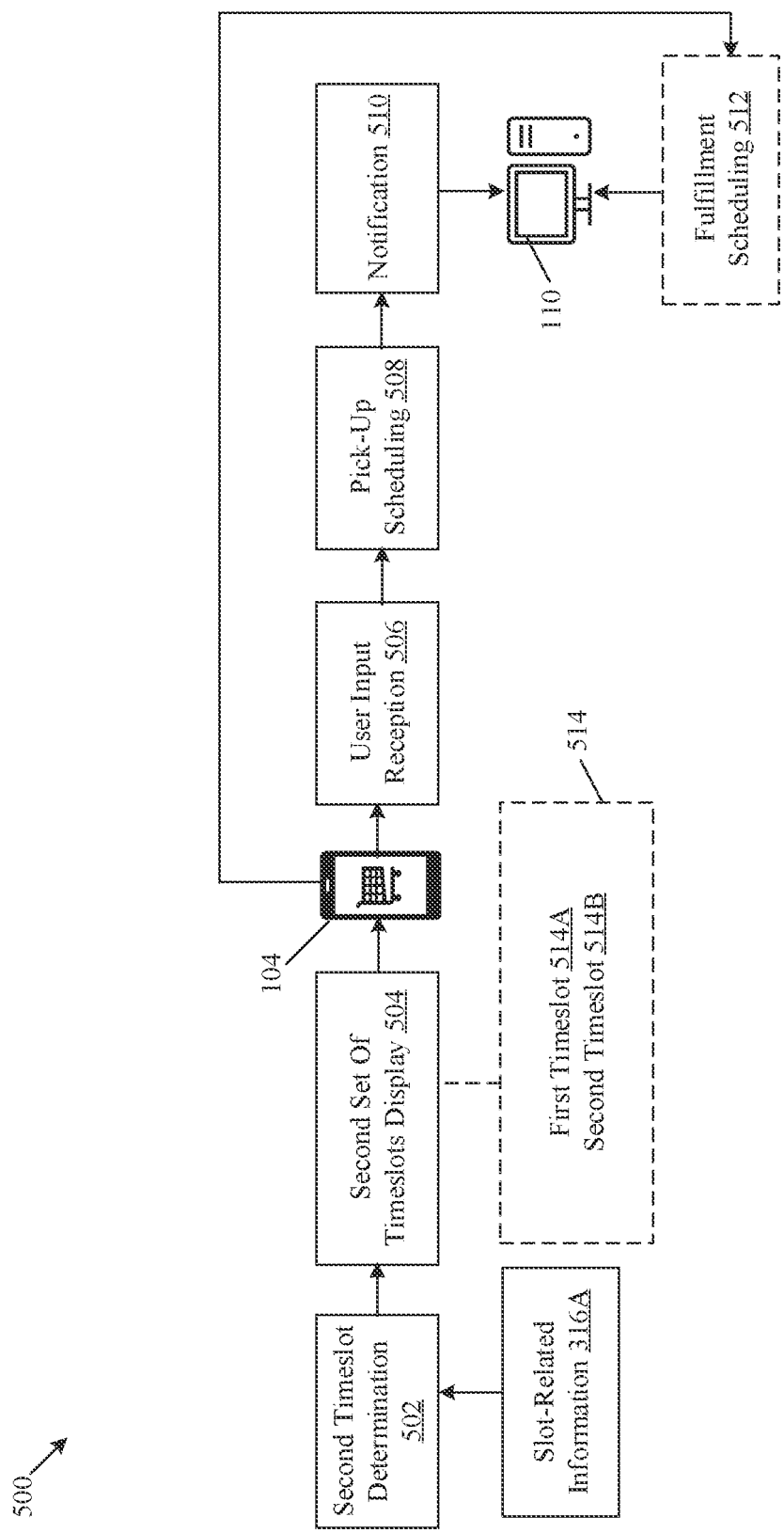
FIG. 5 is a diagram that illustrates another exemplary processing pipeline for slot selection and pickup scheduling, in accordance with an embodiment of the disclosure.

FIG. 5 is a diagram that illustrates another exemplary processing pipeline for slot selection and pickup scheduling, in accordance with an embodiment of the disclosure. FIG. 5 is explained in conjunction with elements from FIG. 1, FIG. 2, FIG. 3, and FIG. 4. With reference to FIG. 5, there is shown a processing pipeline 500 of operations from 502 to 512 to depict slot selection for pickup scheduling and order fulfilment. The operations 502 to 512 of the processing pipeline 500 may be executed by the system 102 of FIG. 1 or the circuitry 202 of FIG. 2.

At 502, a second timeslot may be determined for the received customer order. In an embodiment, the circuitry 202 may be configured to determine the second timeslot for the received customer order, based on the slot-related information 316A. In an embodiment, the second timeslot may be earliest in the first set of timeslots and may accommodate the received customer order in accordance with the capacity constraint. The capacity constraint may be indicative of the number of customer orders to be scheduled for the in-store pickup within each timeslot of the first set of timeslots.

In an embodiment, based on the number of customer orders that may be scheduled within each timeslot and a set of customer orders received prior to the current customer order 314 (and already scheduled in various timeslots in the first set of timeslots), the circuitry 202 may determine an earliest available timeslot in the first set of timeslots. The determined earliest available timeslot in the first set of timeslots may be the second timeslot for the customer order 314.

At 504, a second set of timeslots may be displayed. In an embodiment, the circuitry 202 may be configured to control the customer device 104 to display the second set of timeslots (such as a second set of timeslots 514). The second set of timeslots 514 may be available within a second period and each timeslot in the second set of timeslots 514 may accommodate the received customer order 314. For example, if the first period associated with the first set of timeslots corresponds to next 5 days from the time the customer order is placed, then the second period may correspond to one or more days within the 5-days period. The second set of timeslots 514 may include at least the first timeslot (determined in FIG. 3 and FIG. 4, for example) and the second timeslot.

As an example, the second set of timeslots 514 may include a first timeslot 514A and a second timeslot 514B. The circuitry 202 may transmit information associated with the second set of timeslots 514 to the customer device 104 (as shown in FIG. 5) and may control the user-interface of the web client or the software application of the customer device 104 to display the second set of timeslots 514. An example of a user-interface that displays the first timeslot on the customer device 104 is provided, for example, in FIG. 6.

At 506, a user input associated with the customer 120 may be received. In an embodiment, the circuitry 202 may be configured to receive the user input associated with the customer 120. The customer device 104 may receive the user input via the user-interface of the web client or the software application. The user input may be received in in response to the display of the second set of timeslots 514 on the user-interface. The customer device 104 may transmit information associated with the received user input to the circuitry 202, which may receive the transmitted information associated with the user input. By way of example, and not limitation, the received user input may be indicative of a selection of a final timeslot from the displayed second set of timeslots 514.

At 508, the pickup of the customer order 314 may be scheduled. In an embodiment, the circuitry 202 may be configured to schedule the in-store pickup of the received customer order 314, based on the received user input (which may be received at 506). The in-store pickup may be scheduled within the final timeslot (included in the second set of timeslots 514). For instance, the final timeslot may be one of the first timeslot (for which the pickup wait time is below a threshold) or the second timeslot (which may be the earliest available timeslot).

At 510, at least one of the customer device 104 or the store manager device 110 may be notified. In an embodiment, the circuitry 202 may be configured to transmit a notification to at least one of the customer device 104 or the store manager device 110 (as shown in FIG. 5). The transmitted notification may include an indication of the final timeslot, in which the customer order 314 may be scheduled (as described at 508) for the in-store pickup from the retail store 116. The notification received by the customer device 104 may inform the final timeslot to the customer 120 and may include information (for example, order ID, customer name, a date associated with the final timeslot, and the like) related to the customer order 314. In some scenarios, the notification received by the store manager device 110 may inform the store manager 124 to assign tasks to one or more human workers for servicing the customer order, based on the final timeslot in the notification. Alternatively, the notification on the store manager device 110 may include the final timeslot and information related to the customer order 314. The store manager device 110 may receive an input (from the store manager 124) indicative of whether or not the final timeslot is accepted.

At 512, a fulfillment of the customer order 314 may be scheduled. In an embodiment, the circuitry 202 may be configured to schedule the fulfillment of the customer order 314 that may be already scheduled (as described at 508) for the in-store pickup within the final timeslot. For example, the circuitry 202 may divide the customer order 314 into suborders based on departments or sub-departments to which the set of items in the customer order 314 belongs. The circuitry 202 may allocate one or more order servicing tasks associated with each of the suborders to one or more human workers in the set of human workers 122. The task allocation may be based one or more of, but not limited to, a department associated with each item in the customer order, a department assigned to each human worker, a current availability of each human worker for the one or more order servicing tasks, and a median servicing time for each order/suborder. The fulfillment of the customer order 314 or suborders of the customer order 314 may be scheduled such that the customer order 314 is serviced before the start of the final timeslot scheduled for the in-store pickup.

The circuitry 202 may transmit information related to the schedule for the fulfillment of the customer order 314 to the store manager device 110, as shown in FIG. 5. The information related to the schedule for the fulfillment of the customer order 314 may include details related to the order servicing tasks assigned to the one or more human workers in the set of human workers 122. Based on the received information related to the schedule for the fulfillment of the customer order 314, the store manager device 110 may transmit a notification to a worker device of a respective human worker (of the set of human workers 122). Based on the notification received on a respective work device, the one or more order servicing tasks may be executed by the human worker. The one or more order servicing tasks may include, for example, an identification of an item of a suborder from a sub-department or a department of the retail store 116, a collection and packaging of the identified items, an invoicing of the customer order, and a fulfillment of the customer order based on the item collection, packaging, invoicing, and the like.

FIG. 6 is a diagram that illustrates an example user-interface of a customer device for display of one or more timeslots, in accordance with an embodiment of the disclosure. FIG. 6 is explained in conjunction with elements from FIG. 1, FIG. 2, FIG. 3, FIG. 4, and FIG. 5. With reference to FIG. 6, there is shown a diagram 600 which includes a user-interface 602 of the customer device 104. The user-interface 602 may be associated with the web client or a software application pre-installed on the customer device 104.

As shown in FIG. 6, the user-interface 602 may display one or more timeslots to schedule the in-store pickup of the received customer order (e.g., the customer order 314 with the order ID "1234"). The user-interface 602 may enable a selection of one of the displayed one or more timeslots based on a user input from the customer 120, through the user-interface 602. In an embodiment, the user-interface 602 may display an available set of slots (i.e., the first set of timeslots). For example, the user-interface 602 may display the available set of slots on certain dates, such as "Feb. 22, 2021", "Feb. 23, 2021", and "Feb. 24, 2021". Examples of the available set of slots on the date "Feb. 22, 2021" may include 1 PM-1:30 PM, 3 PM-3:30 PM, 5:30 PM-6 PM, 6 PM-6:30 PM, and 7 PM-7:30 PM. In an embodiment, the user-interface 602 may also display the second set of timeslots 514, which may include a first (or best) slot (i.e., the first timeslot 514A) and a second (or earliest) slot (i.e., the second timeslot 514B). For example, the first slot may be the 3 PM-3:30 PM slot on Feb. 22, 2021 and the second slot may be the 1 PM-1:30 PM slot on Feb. 22, 2021.

In an embodiment, the user-interface 602 may display one or more user-interface elements to enable the customer 120 to provide a user input for selection of the final timeslot. Examples of such user-interface elements may include, but are not limited to, a dropdown, a date-time picker, a textbox, a set of radio buttons, or a set of checkboxes. In an embodiment, the customer device 104 may display one or more notifications, which may prompt the customer 120 to select the first timeslot 514A. Based on the user input from the customer 120 via the displayed user-interface elements, the customer device 104 may select the final timeslot. The user-interface 602 may further include a submit button 604. Based on a user input from the customer 120 for selection of the submit button 604, the selected final timeslot may be confirmed for the in-store pickup of the customer order 314. Thereafter, the customer device 104 may transmit information associated with the selected final timeslot to the circuitry 202 to schedule the in-store pickup of the customer order 314 within the final timeslot. It should be noted that the diagram 600 of FIG. 6 is presented merely as an example and should not be construed as limiting for the scope of the disclosure.

FIG. 7 is a diagram that illustrates an example scenario of processing of out-of-stock items of a customer order, in accordance with an embodiment of the disclosure. FIG. 7 is explained in conjunction with elements from FIG. 1, FIG. 2, FIG. 3, FIG. 4, FIG. 5, and FIG. 6. With reference to FIG. 7, there is shown an exemplary scenario 700, which includes item availability information 702 associated with the customer order 314 and a total store credit 704 that may be available for redemption. The item availability information 702 may indicate (for example, through availability status) items of the customer order 314 that may be available (in the inventory of the retail store 116) for purchase. Also, the item availability information 702 may indicate items of the customer order 314 that may be out-of-stock at the retail store 116. The item availability information 702 may include a store credit associated with each out-of-stock item of the customer order 314. The total store credit 704 may be a sum of the store credit for each unit of the out-of-stock items in the customer order 314.

In an embodiment, the circuitry 202 may be configured to determine one or more items listed in the received customer order 314 to be out-of-stock at the retail store, based on the inventory information 316B. For example, the inventory information 316B may include information related to an identity and a quantity of different items available in the each of the set of departments 118 and/or a warehouse associated with the retail store 116. Based on the identity and the quantity of items available in the retail store 116 and/or the warehouse associated with the retail store 116, the one or more items listed in the customer order 314 may be determined to be out-of-stock. For example, as shown in FIG. 7, the item availability information 702 may indicate that out of the set of items in the customer order 314, one pair of the gents socks (from the shoes-and-apparels department 118E) and two units of the power bank (from the consumer electronics department 118N) may be out-of-stock.

In an embodiment, the circuitry 202 may be configured to control the customer device 104 to further display a reward or an extra store credit which may be available for redemption. The reward or the extract store credit may be displayed based on the determination that the one or more items are out-of-stock. As shown in FIG. 7, based on the item availability information 702, a store credit may be determined for each out-of-stock item in the customer order 314. For example, a first store credit of 5 points may be determined for the out-of-stock gents socks. Also, a second store credit of 50 points (i.e., 25 points for each of the 2 units) may be determined for the out-of-stock power banks. The total store credit 704 of 55 points (i.e., 5+(25*2) points) may be determined for the out-of-stock items of the customer order 314. The circuitry 202 may be configured to control the customer device 104 to display the item availability information 702 and the total store credit 704. The number of points in the total store credit 704 may be credited to an electronic wallet associated with the retail store 116 or may be credited to a bank account of the customer 120. The total store credit 704 may be utilized by the customer 120 to pay for a future order at the retail store 116. It should be noted that the scenario 700 shown in FIG. 7 is presented merely as an example and should not be construed as limiting for the scope of the disclosure.

Figure 8:
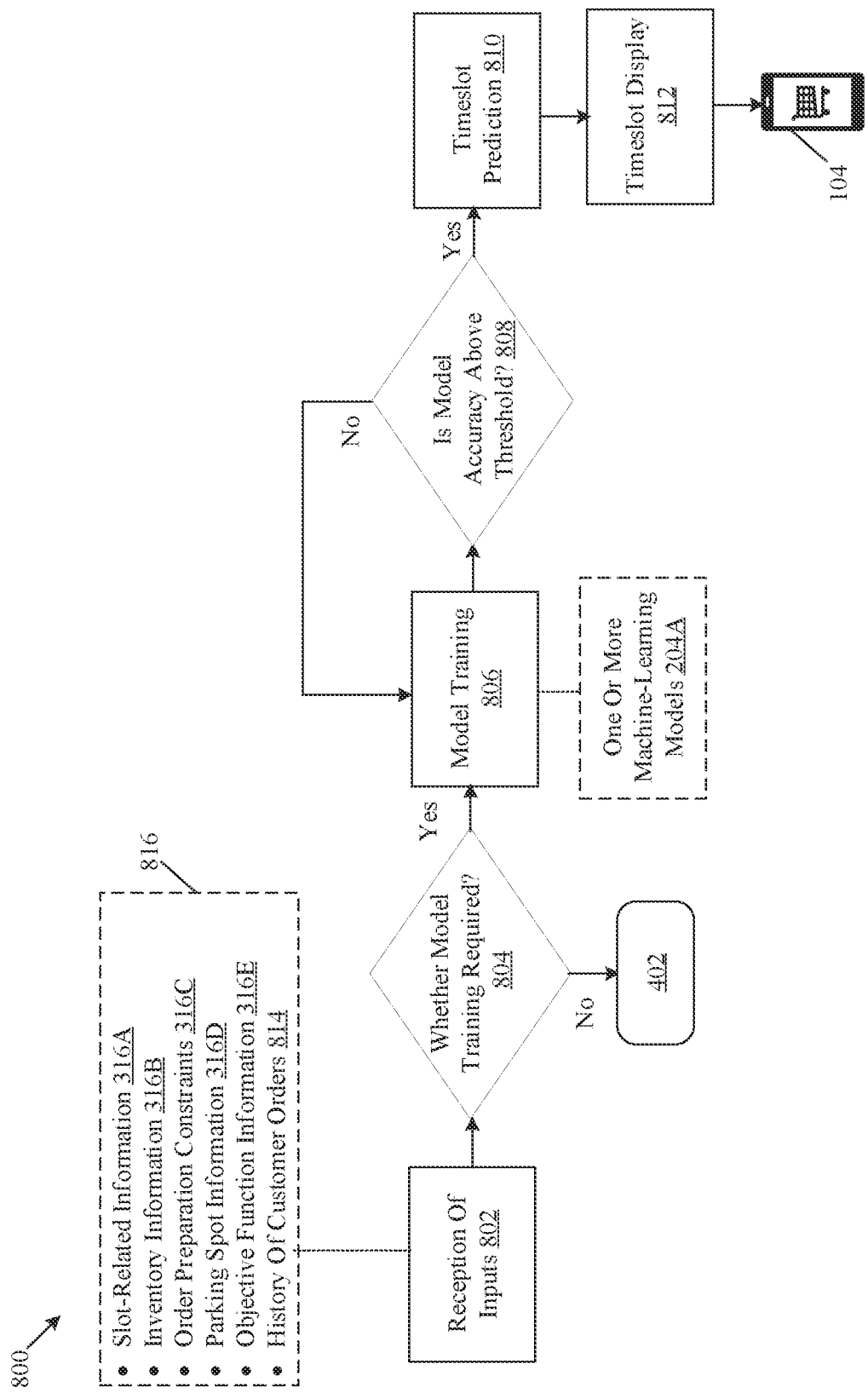
FIG. 8 is a diagram that illustrates an exemplary processing pipeline for training and use of a machine learning model for slot selection, in accordance with an embodiment of the disclosure.

FIG. 8 is a diagram that illustrates an exemplary processing pipeline for training and use of a machine learning model for slot selection, in accordance with an embodiment of the disclosure. FIG. 8 is explained in conjunction with elements from FIG. 1, FIG. 2, FIG. 3, FIG. 4, FIG. 5, FIG. 6, and FIG. 7. With reference to FIG. 8, there is shown a processing pipeline 800 of operations from 802 to 812 that describes training and use of a machine learning model for slot selection. The operations 802 to 812 of the processing pipeline 800 may be executed by the system 102 of FIG. 1 or the circuitry 202 of FIG. 2.

At 802, a set of inputs may be received. In an embodiment, the circuitry 202 may be configured to receive the set of inputs from the retail store management system 106. As an example, the received set of inputs (e.g., a set of inputs 816) may include a history of customer orders 814, and the set of inputs 316 (such as the slot-related information 316A, the inventory information 316B, the order preparation constraints 316C, the parking spot information 316D, and the objective function information 316E). The history of customer orders 814 may include information associated with customer orders placed by different customers within a third time period (such as past few weeks or past few months). In an embodiment, for each customer order, the history of customer orders 814 may include suborders split into departments at the retail store 116, a size of each of the suborders, and a time of service for each of the suborders. For each customer order, the history of customer orders 814 may also include a date and time at which a respective customer order was placed, a date and a timeslot at which the respective customer order was picked up, and a number of items which were out-of-stock in each of the departments.

At 804, it may be determined whether a training of the one or more machine-learning models 204A is required. In an embodiment, the circuitry 202 may be configured to determine whether the training of one or more machine-learning models 204A is required based on a number of customer orders in the history of customer orders 814. In case the number of customer orders is less than a threshold (e.g., 1000 customers orders), the circuitry 202 may determine that the training of the one or more machine-learning models 204A is not required. In such a case, control may pass to 402 of FIG. 4 and the circuitry 202 may be configured to execute the operations from 402 to 410 to determine a timeslot for the slot selection through policy-based optimization (as described in FIG. 4). If the number of customer orders in the history of customer orders 814 is determined as greater than the threshold (e.g., 1000 customer orders), control may pass to 806.

At 806, a machine-learning model (e.g., of the one or more machine-learning models 204A) may be trained. In an embodiment, based on the determination that the training of the one or more machine-learning models 204A may be required (as determined at 804), the circuitry 202 may be configured to train the machine-learning model. In an embodiment, the one or more machine-learning models 204A may be trained on the received set of inputs 816 for a slot prediction task. For example, the history of customer orders 814 may be used to prepare a training dataset for the one or more machine-learning models 204A. The training dataset may include a set of features, such as, but not limited to, the suborders split into departments at the retail store 116, the size of each of the suborders, the time of service for each of the suborders, the date and time at which a respective customer order was placed, and the numbers of items which were out-of-stock in each of the departments. The training dataset may also include the set of inputs 316. In such a case, the set of features may include the slot-related information 316A, the inventory information 316B, the order preparation constraints 316C, the parking spot information 316D, and the objective function information 316E. The training dataset may include an output label, such as the date and the timeslot at which the respective customer order was picked up. Examples of the one or more machine-learning models 204A may include, but are not limited to, a support vector machine (SVM) model and a deep learning model based on artificial neural networks.

At 808, it may be determined whether an accuracy of each of the one or more machine-learning models 204A is above a threshold. In an embodiment, the circuitry 202 may be configured to determine whether the accuracy of each of the one or more machine-learning models 204A is above the threshold (e.g., 90% accuracy). The accuracy may be determined based on a test dataset of customer orders (prepared from the history of customer orders 814 with known output labels, such as the date and the timeslot at which the respective customer order was picked up). In case the accuracy determined for each of the one or more machine-learning models 204A is lesser than the threshold (e.g., 90% accuracy), control may pass to 806 and the one or more machine-learning models 204A may be re-trained, as described at 806. In case the accuracy of a first machine-learning model (of the one or more machine-learning models 204A) is above the threshold (e.g., 90% accuracy), control may pass to 810 and the first machine-learning model may be selected for a slot prediction task (as described at 810). By way of example, and not limitation, in case the accuracy of an SVM model is greater than 90%, then the SVM model may be determined as trained for the slot prediction task and the SVM model may be used for the slot prediction, as described at 810.

In case the accuracy of each of two or more machine-learning models (of the one or more machine-learning models 204A) is determined as greater than the threshold, the machine-learning model with the highest accuracy from the one or more machine-learning models 204A may be selected for the slot prediction task and the selected machine-learning model may be used for slot prediction, as described at 810. For example, if the accuracy of the SVM model and the DL model is 90% and 95%, respectively, then the machine-learning model with the highest accuracy (i.e., the DL model) may be selected and used for the slot prediction (as described at 810).

In certain scenarios, even though the accuracy of the first machine-learning model is above the threshold, the accuracy of a second machine-learning model may be below the threshold. In such a case, the training of the second machine-learning model may continue, as described at 806. With the passage of time, a size of the history of customer orders 814 may increase with more customer orders. Based on the training of the second machine-learning model using the history of customer orders 814 (with increased size), the accuracy of the second machine-learning model may increase. In case the increased accuracy crosses the threshold, the second machine-learning model may be used for the slot prediction task instead of the first machine learning model.

By way of example, and not limitation, initially the SVM model may have a higher accuracy than the DL model and may be selected for the slot prediction. The history of customer orders 814 may increase in size with more customer orders over time. When the accuracy of the SVM model crosses the threshold (e.g. 90%), then the SVM model may be selected for the slot prediction, as described at 810. Over time, as both the SVM model and the DL model are trained using the history of customer orders 814 (data size increased over time), the accuracy of the DL model may exceed the accuracy of the SVM model. For example, as the number of records of customer orders in the history of customer orders 814 grow to more than 10000 records, the accuracy of the DL model may cross 96%, while the accuracy of the SVM model may remain at 95% or less. In such a case, the DL model may be selected for the slot prediction, as described at 810.

At 810, a timeslot may be predicted. In an embodiment, the circuitry 202 may be configured to predict the timeslot (e.g., a third timeslot) for the received customer order 314, based on a trained machine learning model selected (at 808) for the slot prediction task. The trained machine learning model may be one of the one or more machine-learning models 204A. In an embodiment, the third timeslot may be a timeslot included in the first set of timeslots for the customer order 314. The third timeslot may accommodate the received customer order 314 without a violation of the capacity constraint and the pickup wait time within the third timeslot may be below a threshold (e.g., a few minutes).

In an embodiment, the trained machine learning model may predict a plurality of timeslots, which may be suitable for the in-store pickup of the customer order 314. Based on the capacity constraint, the circuitry 202 may filter the predicted plurality of timeslots to select the third timeslot from the filtered plurality of timeslots.

At 812, the predicted timeslot may be displayed. In an embodiment, the circuitry 202 may be configured to control the customer device 104 to display the predicted third timeslot. The circuitry 202 may transmit information associated with the third timeslot to the customer device 104 (as shown in FIG. 8) and may control the user-interface of the web client or the pre-installed software application on the customer device 104 to display the third timeslot. Similar to the first timeslot, the third timeslot may be a timeslot that may be an optimal or best choice for the customer 120 and for the retail store 116. For example, a selection of the third timeslot by the customer 120 for the in-store pickup of the customer order 314 may ensure that the customer 120 waits for a minimum time within the third timeslot for pickup of the customer order 314. The third timeslot may maximize the resource utilization and service levels for the retail store 116.

Though the disclosure is described with respect to a retail store, the scope of the disclosure may not be so limited. The disclosure may also be implemented in various other scenarios such as, but not limited to, a food take-away restaurant with multiple cuisines or menu options or a banking or financial institution with multiple departments.

Figure 9:
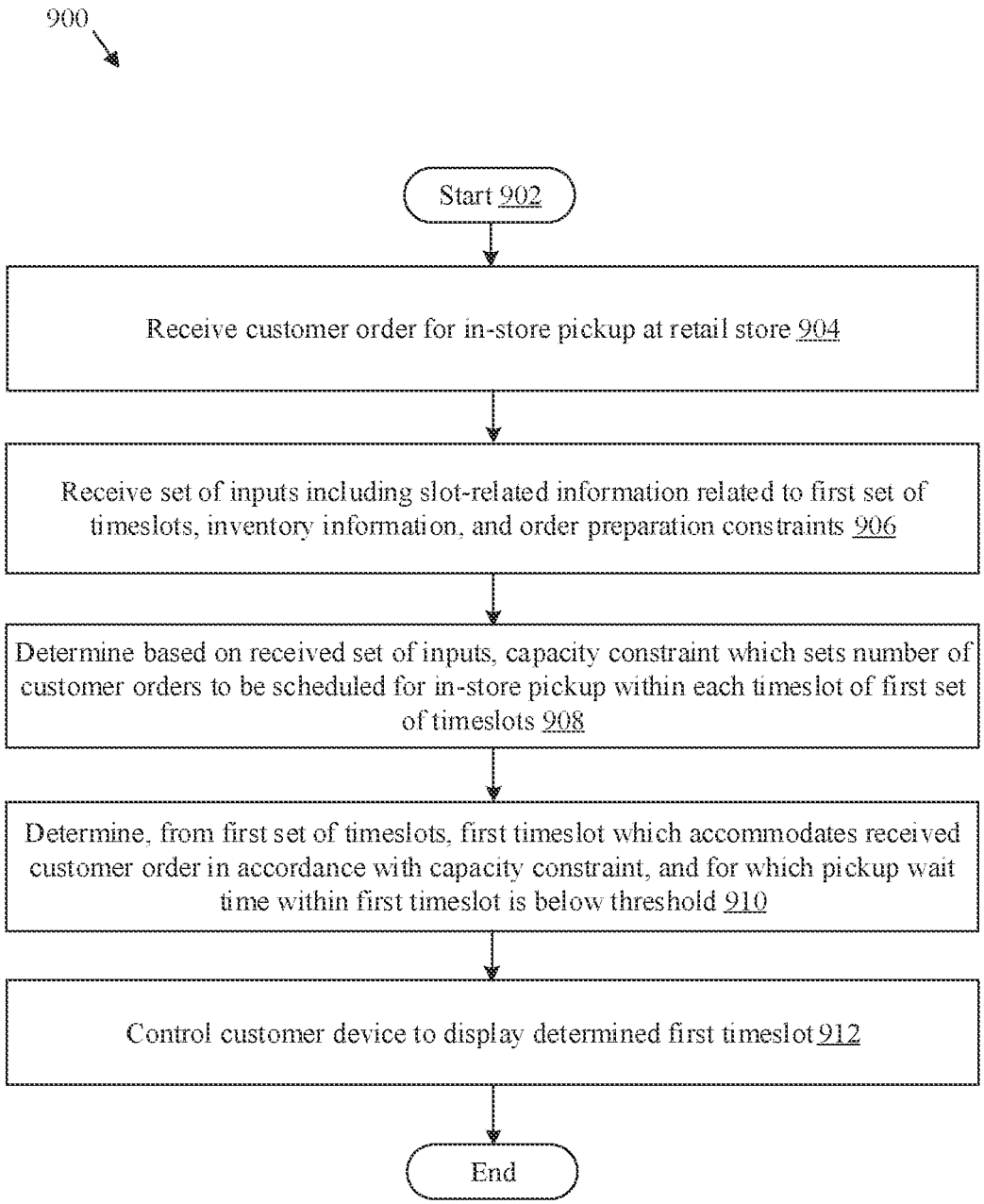
FIG. 9 is a flowchart that illustrates exemplary operations for slot selection, in accordance with an embodiment of the disclosure.

FIG. 9 is a flowchart that illustrates exemplary operations for slot selection, in accordance with an embodiment of the disclosure. FIG. 9 is described in conjunction with elements from FIG. 1, FIG. 2, FIG. 3, FIG. 4, FIG. 5, FIG. 6, FIG. 7, and FIG. 8. With reference to FIG. 9, there is shown a flowchart 900. The flowchart 900 may include operations 904 to 912 may be implemented in the system 102. The flowchart 900 may start at 902 and proceed to 904.

At 904, the customer order 314 may be received for the in-store pickup at the retail store 116. In an embodiment, the circuitry 202 may be configured to receive the customer order 314 for the in-store pickup at the retail store 116. The customer order 314 may be received from the customer device 104. Through the web client or the software application (which may be installed on the customer device 104), the customer device 104 may display a user-interface. The displayed user-interface may enable the customer 120 to place the customer order. The customer order may be for purchase of a set of items from the retail store 116 through an in-store pickup option. Based on a user input through the displayed user-interface, the customer device 104 may generate the customer order. The customer order may be indicative of the set of items purchased by the customer 120. The customer device 104 may transmit the generated customer order to the system 102, via the communication network 112. The circuitry 202 may receive the transmitted customer order from the customer device 104.

At 906, the set of inputs (e.g., the set of inputs 316) including the slot-related information 316A related to the first set of timeslots, the inventory information 316B, and the order preparation constraints 316C may be received. In an embodiment, the circuitry 202 may be configured to receive the set of inputs (e.g., the set of inputs 316) which may include, for example, the slot-related information 316A, the inventory information 316B, and the order preparation constraints 316C. The set of inputs 316 may be received from the retail store management system 106. Details related to the set of inputs 316 are provided further, for example, in FIG. 3.

At 908, based on the received set of inputs 316, the capacity constraint may be determined. The capacity constraint may set the number of customer orders to be scheduled for the in-store pickup within each timeslot of the first set of timeslots. In an embodiment, the circuitry 202 may be configured to determine the capacity constraint based on the received set of inputs 316. The determination of the capacity constraint is described further, for example, in FIG. 3.

At 910, the first timeslot may be determined from the first set of timeslots. The first timeslot may accommodate the received customer order 314 in accordance with the capacity constraint. Also, for the first timeslot, the pickup wait time within the first timeslot may be below a threshold (e.g., a few minutes). In an embodiment, the circuitry 202 may be configured to determine the first timeslot. The first timeslot may be an optimal timeslot for the retail store 116 as the first timeslot may maximize the service levels and the utilization of the set of human workers 122 of the retail store 116. The determination of the first timeslot is described further, for example, in FIGS. 3, 4, and 8.

At 912, the customer device 104 may be controlled to display the determined first timeslot. In an embodiment, the circuitry 202 may be configured to control the customer device 104 to display the determined first timeslot. The circuitry 202 may transmit information associated with the first timeslot to the customer device 104 and may control the user-interface of the web client or the software application on the customer device 104, to display the first timeslot. An example of a user-interface to display the first timeslot on the customer device 104 is provided, for example, in FIG. 6. Control may pass to the end.

Although the flowchart 900 is illustrated as discrete operations, such as 904, 906, 908, 910, and 912, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer readable medium and/or storage medium having stored thereon, instructions executable by a machine and/or a computer to operate a system (for example, the system 102). The instructions may cause the system 102 to perform operations that include receiving a customer order (e.g., the customer order 314) for an in-store pickup at a retail store (e.g., the retail store 116). The operations may further include receiving a set of inputs including, but not limited to, slot-related information (e.g., the slot-related information 316A) related to a first set timeslots available at the retail store 116 within a first period, inventory information (e.g., the inventory information 316B), and order preparation constraints (e.g., the order preparation constraints 316C) related to a number of human workers (e.g., the set of human workers 122) at the retail store 116. The operations may further include determining a capacity constraint based on the received set of inputs (e.g., the slot-related information 316A, the inventory information 316B, and the order preparation constraints 316C). The capacity constraint may set a number of customer orders to be scheduled for the in-store pickup within each timeslot of the first set of timeslots. The operations may further include determining, from the first set of timeslots, a first timeslot which may accommodate the received customer order 314 in accordance with the capacity constraint, and for which a pickup wait time within the first timeslot may be below a threshold. The operations may further include controlling a customer device (e.g., the customer device 104) to display the determined first timeslot.

Exemplary aspects of the disclosure may provide a system (such as, the system 102 of FIG. 1) that includes circuitry (such as, the circuitry 202). The circuitry 202 may be configured to receive a customer order (e.g., the customer order 314) for an in-store pickup at a retail store (e.g., the retail store 116). The circuitry 202 may be further configured to receive a set of inputs including, but not limited to, slot-related information (e.g., the slot-related information 316A) related to a first set timeslots available at the retail store 116 within a first period, inventory information (e.g., the inventory information 316B), and order preparation constraints (e.g., the order preparation constraints 316C) related to a number of human workers (e.g., the set of human workers 122) at the retail store 116. The circuitry 202 may be further configured to determine a capacity constraint, based on the received set of inputs (e.g., the slot-related information 316A, the inventory information 316B, and the order preparation constraints 316C). The capacity constraint may set a number of customer orders to be scheduled for the in-store pickup within each timeslot of the first set of timeslots. The circuitry 202 may be further configured to determine, from the first set of timeslots, a first timeslot which may accommodate the received customer order 314 in accordance with the capacity constraint, and for which a pickup wait time within the first timeslot may be below a threshold. The circuitry 202 may be further configured to control a customer device (e.g., the customer device 104) to display the determined first timeslot.

In an embodiment, the received set of inputs may further include a number of parking spots (e.g., the parking spot information 316D) which are available for the in-store pickup, and initial weights (e.g., the objective function information 316E) for objectives. Herein, the objectives may include, but are not limited to, a first objective (e.g., the first objective 412) to maximize a service level for the received customer order 314 above a service level threshold, and a second objective (e.g., the second objective 414) to maximize a resource utilization of the number of human workers within each of the first set of timeslots above a utilization threshold.

In an embodiment, the slot-related information 316A may include, but is not limited to, a number of timeslots available within the first set of timeslots on each day and a length of each timeslot of the first set of timeslots. Further, the inventory information 316B includes a database of the items sold by the retail store 116. For each of the items, the database may include a unique product code or identifier, at least one of an item weight or an item volume, an item quantity, and a department to which the respective item belongs. Further, the order preparation constraints 316C may include, but are not limited to, the number of human workers available in each timeslot of the first set of timeslots, a number of hours each human workers works in a day, and a median time to fulfil an average customer order or suborder.

In an embodiment, the circuitry 202 may be further configured to divide the received customer order 314 into suborders based on a number of departments (e.g., the set of departments 118) at the retail store 116.

In an embodiment, the circuitry 202 may be further configured to select constraints and parameters of an optimization problem based on the received set of inputs. The circuitry 202 may be further configured to select the first set of timeslots as integer variables of the optimization problem. Further, the circuitry 202 may be configured to formulate an objective function of the optimization problem based on the integer variables and the selected constraints and parameters. The objective function may include, but is not limited to, a first objective (e.g., the first objective 412) to maximize a service level for the received customer order 314, and a second objective (e.g., the second objective 414) to maximize a resource utilization of the number of human workers (e.g., the set of human workers 122) within each of the first set of timeslots. In an embodiment, the optimization problem may be a stochastic optimization problem. The circuitry 202 may be further configured to generate an integer solution (e.g., the integer solution 416) of the optimization problem based on solving the objective function using a Mixed-Integer Non-Linear Programming (MINLP) approach. Herein, the first timeslot may be determined based on the integer solution 416.

In an embodiment, the circuitry 202 may be further configured to determine a second timeslot for the received customer order 314, based on the slot-related information 316A. The second timeslot may be earliest in the first set of timeslots and may accommodate the received customer order in accordance with the capacity constraint. In an embodiment, the circuitry 202 may be further configured to control the customer device 104 to display a second set of timeslots, which may be available within a second period and each of which may accommodate the received customer order 314. The second set of timeslots may include at least the first timeslot and the second timeslot. The circuitry 202 may be further configured to receive a user input via the customer device 104. Further, based on the received user input, the circuitry 202 may be configured to schedule the in-store pickup of the received customer order 314 within a final timeslot, which may be included in the second set of timeslots.

In an embodiment, the circuitry may be further configured to determine one or more items listed in the received customer order 314 to be out-of-stock at the retail store 116, based on the inventory information 316B. The circuitry 202 may be further configured to control the customer device 104 to further display a reward or an extra store credit which may be available for redemption. The reward or the extra store credit may be displayed based on the determination that the one or more items are out-of-stock.

In an embodiment, the received set of inputs may further include a history of customer orders placed within a third period. Herein, for each customer order, the history of customer orders may include, but is not limited to, suborders split into departments at the retail store 116, a size of each of the suborders, a time of service for each of the suborders, a date and time at which a respective customer order was placed, a date and a timeslot at which the respective customer order was picked up, and a numbers of items which were out-of-stock in each of the departments.

In an embodiment, the circuitry 202 may be further configured to train a machine learning model (e.g., the one or more machine-learning models 204A) on the received set of inputs for a slot prediction task. For the received customer order, the trained machine learning model (e.g., the one or more machine-learning models 204A) may learn to predict a third timeslot, which may accommodate the received customer order 314 without a violation of the capacity constraint and for which the pickup wait time may be below the threshold.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A system, comprising:
    circuitry configured to:
        receive a customer order for an in-store pickup at a retail store;
        receive a set of inputs comprising:
            slot-related information related to a first set of timeslots available at the retail store within a first time-period,
            inventory information related to items sold by the retail store,
            order preparation constraints related to a number of human workers at the retail store,
            a history of customer orders associated with the retail store, and
            initial weights for an objective function which include:
                a first objective to maximize a service level for the received customer order above a service level threshold, wherein the service level for the received customer order is based on a customer preference for a first timeslot assigned to the received customer order and a time required to service the customer order in the first timeslot, and
                a second objective to maximize a resource utilization of the number of the human workers within each of the first set of timeslots above a utilization threshold;
        determine, based on the received set of inputs, a capacity constraint which sets a number of customer orders to be scheduled for the in-store pickup within each timeslot of the first set of timeslots;
        divide the received customer order into a plurality of suborders based on the inventory information, wherein
            each suborder of the plurality of suborders is associated with a department of a plurality of departments in the retail store, and
            the order preparation constraints comprise an average time required by a human worker to service a specific sub-order, of a specific size, including at least one item associated with a specific department of the retail store;
        train a first machine learning (ML) model and a second ML model on a training dataset for a slot prediction task, wherein the training dataset includes the history of customer orders of a first size;
        select, at a first time, the first ML model for the slot prediction task based on the training dataset and an accuracy of each of the first ML model and the second ML model;
        train the first ML model and the second ML model on an updated training dataset for the slot prediction task, wherein the updated training dataset includes the history of customer orders of a second size greater than the first size;
        select, at a second time, the second ML model for the slot prediction task based on the updated training dataset and a change in the accuracy of each of the first ML model and the second ML model;
        control one of the selected first ML model or the selected second ML model to determine, from the first set of timeslots, the first timeslot which accommodates the received customer order in accordance with the capacity constraint and the order preparation constraints, and for which a pickup wait time within the first timeslot is below a threshold; and
        control a customer device to display the determined first timeslot.

2. The system according to claim 1, wherein the received set of inputs further comprise a number of parking spots which are available for the in-store pickup.

3. The system according to claim 1, wherein the slot-related information comprises a number of timeslots available within the first set of timeslots on each day and a length of each timeslot of the first set of timeslots.

4. The system according to claim 1, wherein the inventory information comprises a database of the items sold by the retail store, and
    wherein for each of the items, the database comprises a unique product code or identifier, at least one of an item weight or an item volume, an item quantity, and the department to which the respective item belongs.

5. The system according to claim 1, wherein the order preparation constraints comprises:
    the number of the human workers available in each timeslot of the first set of timeslots,
    a number of hours each of the human workers works in a day, and
    a median time to fulfil an average customer order or suborder.

6. The system according to claim 1, wherein the circuitry is further configured to divide the received customer order into the plurality of suborders based on a number of the plurality of departments at the retail store.

7. The system according to claim 1, wherein the circuitry is further configured to:

select constraints and parameters of an optimization problem based on the received set of inputs;
select the first set of timeslots as integer variables of the optimization problem; and
formulate the objective function of the optimization problem based on the integer variables and the selected constraints and parameters, wherein the objective function includes the first objective and the second objective.

8. The system according to claim 7, wherein the optimization problem is a stochastic optimization problem.

9. The system according to claim 7, wherein the circuitry is further configured to generate an integer solution of the optimization problem based on solving the objective function using a Mixed-Integer Non-Linear Programming (MINLP) approach, wherein the first timeslot is determined based on the integer solution.

10. The system according to claim 1, wherein the circuitry is further configured to determine a second timeslot for the received customer order, based on the slot-related information, and
wherein the second timeslot is earliest in the first set of timeslots and accommodates the received customer order in accordance with the capacity constraint.

11. The system according to claim 10, wherein the circuitry is further configured to:
control the customer device to display a second set of timeslots, which are available within a second time-period and each of which accommodates the received customer order,
wherein the second set of timeslots comprises at least the first timeslot and the second timeslot;
receive a user input via the customer device; and
schedule, based on the received user input, the in-store pickup of the received customer order within a final timeslot, which is included in the second set of timeslots.

12. The system according to claim 1, wherein the circuitry is further configured to:
determine one or more items listed in the received customer order to be out-of-stock at the retail store, based on the inventory information; and
control the customer device to further display a reward or an extra store credit which is available for redemption, wherein the reward or the extra store credit is displayed based on the determination that the one or more items are out-of-stock.

13. The system according to claim 1,
wherein for each customer order, the history of customer orders comprises the plurality of suborders split into the plurality of departments at the retail store, a size of each of the plurality of suborders, a time of service for each of the plurality of suborders, a date and time at which a respective customer order was placed, a date and a timeslot at which the respective customer order was picked up, and a number of items which were out-of-stock in each of the plurality of departments.

14. A method, comprising:
in a system:
receiving a customer order for an in-store pickup at a retail store;
receiving a set of inputs comprising:
slot-related information related to a first set of timeslots available at the retail store within a first time-period,
inventory information related to items sold by the retail store,
order preparation constraints related to a number of human workers at the retail store,
a history of customer orders associated with the retail store, and
initial weights for an objective function which include:
a first objective to maximize a service level for the received customer order above a service level threshold, wherein the service level for the received customer order is based on a customer preference for a first timeslot assigned to the received customer order and a time required to service the customer order in the first timeslot, and
a second objective to maximize a resource utilization of the number of the human workers within each of the first set of timeslots above a utilization threshold;
determining, based on the received set of inputs, a capacity constraint which sets a number of customer orders to be scheduled for the in-store pickup within each timeslot of the first set of timeslots;
dividing the received customer order into a plurality of suborders based on the inventory information, wherein
each suborder of the plurality of suborders are associated with a department of a plurality of departments in the retail store, and
the order preparation constraints comprise an average time required by a human worker to service a specific sub-order, of a specific size, including at least one item associated with a specific department of the retail store;
training a first machine learning (ML) model and a second ML model on a training dataset for a slot prediction task, wherein the training dataset includes the history of customer orders of a first size;
selecting, at a first time, the first ML model for the slot prediction task based on the training dataset and an accuracy of each of the first ML model and the second ML model;
training the first ML model and the second ML model on an updated training dataset for the slot prediction task, wherein the updated training dataset includes the history of customer orders of a second size greater than the first size;
selecting, at a second time, the second ML model for the slot prediction task based on the updated training dataset and a change in the accuracy of each of the first ML model and the second ML model;
controlling one of the selected first ML model or the selected second ML model to determine, from the first set of timeslots, the first timeslot which accommodates the received customer order in accordance with the capacity constraint and the order preparation constraints, and for which a pickup wait time within the first timeslot is below a threshold; and
controlling a customer device to display the determined first timeslot.

15. The method according to claim 14, further comprising:
selecting constraints and parameters of an optimization problem based on the received set of inputs;
selecting the first set of timeslots as integer variables of the optimization problem; and
formulating the objective function of the optimization problem based on the integer variables and the selected constraints and parameters, wherein the objective function includes the first objective and the second objective.

16. The method according to claim 15, wherein the optimization problem is a stochastic optimization problem.

17. The method according to claim 15, further comprising generating an integer solution of the optimization problem based on solving the objective function using a Mixed-Integer Non-Linear Programming (MINLP) approach, wherein the first timeslot is determined based on the integer solution.

18. The method according to claim 14, further comprising determining a second timeslot for the received customer order, based on the slot-related information, wherein the second timeslot is earliest in the first set of timeslots and accommodates the received customer order in accordance with the capacity constraint.

19. A non-transitory computer-readable medium having stored thereon, computer-executable instructions that when executed by a system, causes the system to execute operations, the operations comprising:
  receiving a customer order for an in-store pickup at a retail store;
  receiving a set of inputs comprising:
    slot-related information related to a first set of timeslots available at the retail store within a first time-period,
    inventory information related to items sold by the retail store,
    order preparation constraints related to a number of human workers at the retail store,
    a history of customer orders associated with the retail store, and
    initial weights for an objective function which include:
      a first objective to maximize a service level for the received customer order above a service level threshold, wherein the service level for the received customer order is based on a customer preference for a first timeslot assigned to the received customer order and a time required to service the customer order in the first timeslot, and
      a second objective to maximize a resource utilization of the number of the human workers within each of the first set of timeslots above a utilization threshold;
  determining, based on the received set of inputs, a capacity constraint which sets a number of customer orders to be scheduled for the in-store pickup within each timeslot of the first set of timeslots;
  dividing the received customer order into a plurality of suborders based on the inventory information, wherein each suborder of the plurality of suborders are associated with a department of a plurality of departments in the retail store, and
    the order preparation constraints comprise an average time required by a human worker to service a specific sub-order, of a specific size, including at least one item associated with a specific department of the retail store;
  training a first machine learning (ML) model and a second ML model on a training dataset for a slot prediction task, wherein the training dataset includes the history of customer orders of a first size;
  selecting, at a first time, the first ML model for the slot prediction task based on the training dataset and an accuracy of each of the first ML model and the second ML model;
  training the first ML model and the second ML model on an updated training dataset for the slot prediction task, wherein the updated training dataset includes the history of customer orders of a second size greater than the first size;
  selecting, at a second time, the second ML model for the slot prediction task based on the updated training dataset and a change in the accuracy of each of the first ML model and the second ML model;
  controlling one of the selected first ML model or the selected second ML model to determine, from the first set of timeslots, the first timeslot which accommodates the received customer order in accordance with the capacity constraint and the order preparation constraints, and for which a pickup wait time within the first timeslot is below a threshold; and
  controlling a customer device to display the determined first timeslot.

* * * * *